(12) United States Patent
Yi et al.

(10) Patent No.: US 12,034,537 B2
(45) Date of Patent: Jul. 9, 2024

(54) METHOD AND APPARATUS FOR TRANSMITTING UPLINK CHANNEL IN WIRELESS COMMUNICATION SYSTEM

(71) Applicant: SAMSUNG ELECTRONICS CO., LTD., Suwon-si (KR)

(72) Inventors: Junyung Yi, Suwon-si (KR); Youngbum Kim, Suwon-si (KR); Jeongho Yeo, Suwon-si (KR); Seunghoon Choi, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/657,087

(22) Filed: Mar. 29, 2022

(65) Prior Publication Data

US 2022/0329353 A1    Oct. 13, 2022

(30) Foreign Application Priority Data

Mar. 30, 2021  (KR) .......................... 10-2021-0041438

(51) Int. Cl.
*H04L 1/08*     (2006.01)
*H04W 72/0446*  (2023.01)
*H04W 72/21*    (2023.01)

(52) U.S. Cl.
CPC ........... *H04L 1/08* (2013.01); *H04W 72/0446* (2013.01); *H04W 72/21* (2023.01)

(58) Field of Classification Search
None
See application file for complete search history.

(56) References Cited

U.S. PATENT DOCUMENTS

| 2021/0067950 | A1  | 3/2021 | Hosseini et al. | |
| 2022/0255647 | A1* | 8/2022 | Sahraei | H04W 72/0446 |
| 2022/0294593 | A1* | 9/2022 | Park | H04L 1/1874 |
| 2022/0303988 | A1* | 9/2022 | Yi | H04L 1/1887 |

FOREIGN PATENT DOCUMENTS

| EP | 4274341 A1 * | 11/2023 | ......... H04L 25/0204 |
| EP | 4319367 A1 * | 2/2024  | ............ H04W 72/04 |
| WO | WO-2022201403 A1 * | 9/2022 | |

OTHER PUBLICATIONS

International Search Report and Written Opinion of the International Searching Authority dated Jun. 23, 2022, in connection with International Application No. PCT/KR2022/004456, 9 pages.

(Continued)

*Primary Examiner* — Kenny S Lin

(57) ABSTRACT

The disclosure relates to a communication technique for combining an IoT technology with a 5G communication system for supporting a higher data transmission rate beyond a 4G system, and a system therefor. The disclosure may be applied to intelligent services (for example, smart homes, smart buildings, smart cities, smart cars or connected cars, health care, digital education, retail businesses, security and safety related services, and the like) based on 5G communication technologies and IoT-related technologies. The disclosure provides a method for improving the coverage of an uplink channel for uplink transmission.

16 Claims, 17 Drawing Sheets

(56) References Cited

OTHER PUBLICATIONS

Samsung, "TB processing over multi-slot PUSCH", R1-2101222, 3GPP TSG RAN WG1 #104 e, Jan. 25-Feb. 5, 2021, 5 pages.
China Telecom, "Enhancements on PUSCH repetition type A", R1-2100915, 3GPP TSG RAN WG1 # 104-e, Jan. 25-Feb. 5, 2021, 3 pages.
Ericsson, "TB processing over multi-slot PUSCH", R1-2101521, 3GPP TSG RAN WG1 #104-e, Jan. 25-Feb. 5, 2021, 8 pages.
Nokia et al., "Transport block processing for PUSCH coverage enhancements", R1-2101711, 3GPP TSG RAN WG1 #104-e, Jan. 25-Feb. 5, 2021, 6 pages.

\* cited by examiner

FIG. 3

One symbol pattern (301)

| | |
|---|---|
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |

Two symbol pattern (302)

| | |
|---|---|
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |

One symbol pattern (303)

| | |
|---|---|
| 4/5 | CDM group 2 |
| 4/5 | |
| 2/3 | CDM group 1 |
| 2/3 | |
| 0/1 | CDM group 0 |
| 0/1 | |
| 4/5 | CDM group 2 |
| 4/5 | |
| 2/3 | CDM group 1 |
| 2/3 | |
| 0/1 | CDM group 0 |
| 0/1 | |

Two symbol pattern (304)

| | |
|---|---|
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |

FIG. 7
Transport block processing over multi-slot PUSCH (TBoMS):
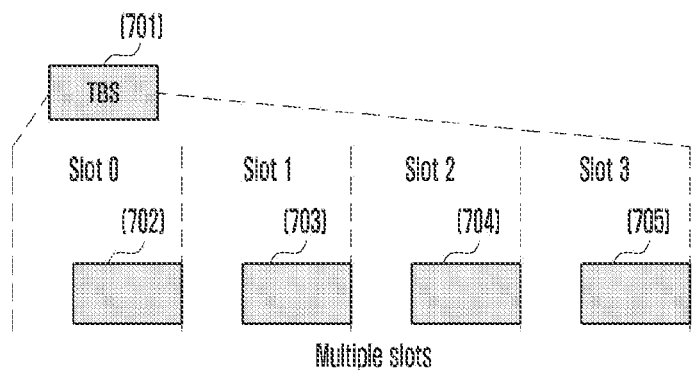
PUSCH repetition type A like TDRA for TBoMS (S=5, L=9, k=4) (706):
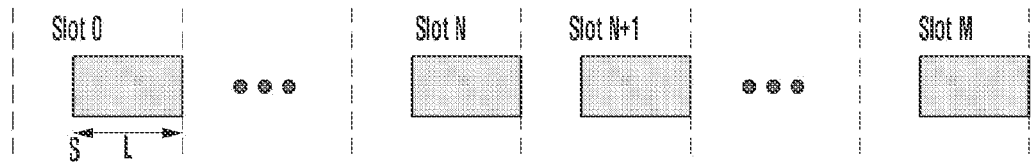
PUSCH repetition type B like TDRA with long symbol L for TBoMS (707):
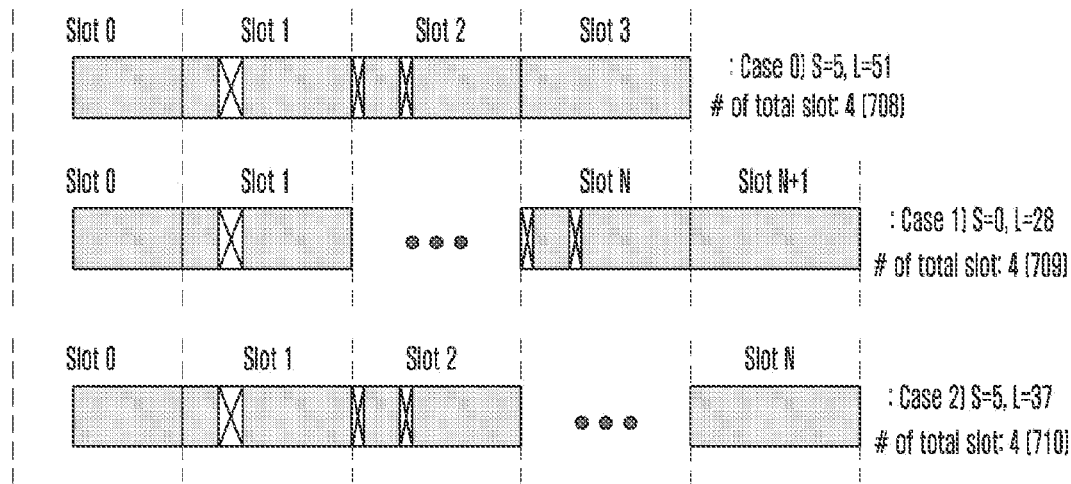

FIG. 12
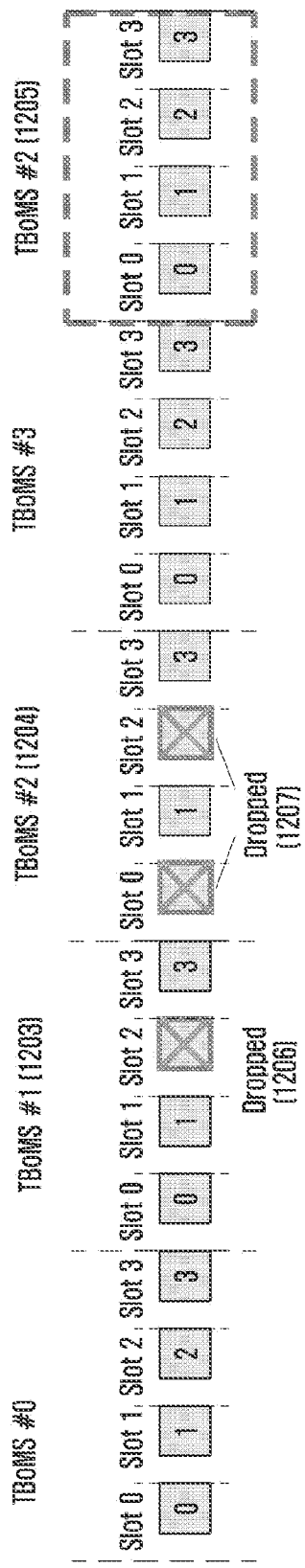
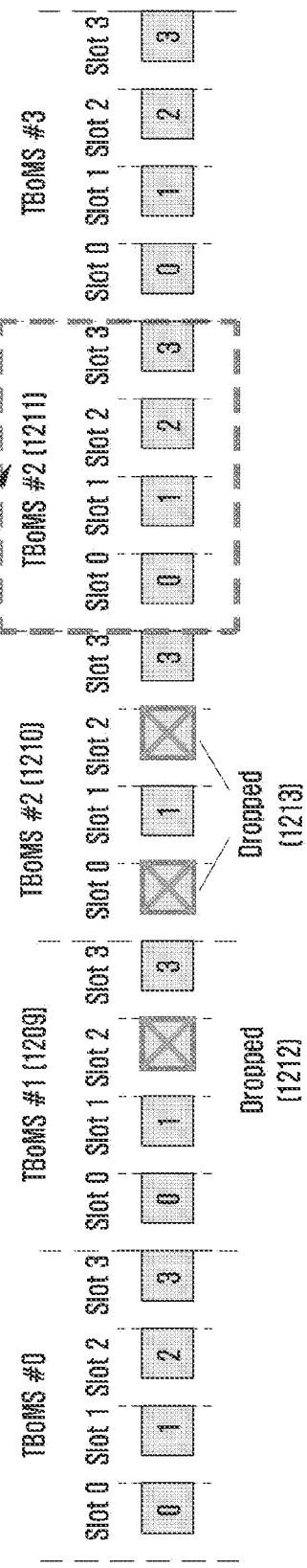

FIG. 13

METHOD AND APPARATUS FOR TRANSMITTING UPLINK CHANNEL IN WIRELESS COMMUNICATION SYSTEM

CROSS-REFERENCE TO RELATED APPLICATIONS

This application is based on and claims priority under 35 U.S.C. § 119 to Korean Patent Application No. 10-2021-0041438, filed on Mar. 30, 2021, in the Korean Intellectual Property Office, the disclosure of which is herein incorporated by reference in its entirety.

BACKGROUND

1. Field

The present disclosure relates to a method and an apparatus wherein a base station or a terminal transmits/receives an uplink channel.

2. Description of Related Art

To meet the demand for wireless data traffic having increased since deployment of $4^{th}$ generation (4G) communication systems, efforts have been made to develop an improved 5G or pre-5G communication system. Therefore, the $5^{th}$ generation (5G) or pre-5G communication system is also called a "beyond 4G network" communication system or a "post LTE" system. The 5G communication system defined by 3GPP is called a "new radio (NR) system." The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beam-forming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

In line with recent development of 5G communication systems, there has been a need for a method for repeatedly transmitting an uplink in order to expand cell coverage in a mmWave band.

SUMMARY

The disclosure provides a method and an apparatus for transmitting a physical uplink channel (PUSCH) by using multiple slots in order to improve the coverage of an uplink channel in a wireless communication system.

The technical subjects pursued in the disclosure may not be limited to the above mentioned technical subjects, and other technical subjects which are not mentioned may be clearly understood, through the following descriptions, by those skilled in the art to which the disclosure pertains.

In order to solve the above-mentioned problems, a method performed by a terminal in a wireless communication system according to the disclosure may include receiving, from a base station, a message including configuration information for a physical uplink shared channel (PUSCH) transmission; identifying, based on the configuration information, first information for configuring transport block processing over multi-slots (TBoMS) and second information on PUSCH repetition associated with the TBoMS, identifying a time duration for the PUSCH repetition based on the first information and the second information, and determining that the time duration is no larger than a restriction of preconfigured time resources.

A method performed by a base station in a wireless communication system may include generating first information for configuring transport block processing over multi-slots (TBoMS) and second information on PUSCH repetition associated with the TBoMS, and transmitting, to a terminal, a message including configuration information for a physical uplink shared channel (PUSCH) transmission, wherein the configuration information includes the first information and the second information, a time duration for the PUSCH repetition is based on the first information and the second information, and the time duration is no larger than a restriction of preconfigured time resources.

A terminal in a wireless communication system may include a transceiver and a controller configured to control the transceiver to receive, from a base station, a message including configuration information for a physical uplink shared channel (PUSCH) transmission, identify, based on the configuration information, first information for configuring transport block processing over multi-slots (TBoMS)

and second information on PUSCH repetition associated with the TBoMS, identify a time duration for the PUSCH repetition based on the first information and the second information, and determine that the time duration is no larger than a restriction of preconfigured time resources.

A base station in a wireless communication system may include a transceiver and a controller configured to generate first information for configuring transport block processing over multi-slots (TBoMS) and second information on PUSCH repetition associated with the TBoMS, and control the transceiver to transmit, to a terminal, a message including configuration information for a physical uplink shared channel (PUSCH) transmission, wherein the configuration information includes the first information and the second information, a time duration for the PUSCH repetition is based on the first information and the second information, and the time duration is no larger than a restriction of preconfigured time resources.

An embodiment of the disclosure provides a method for configuring the maximum number of transmittable slots in connection with uplink transmission having a single transport block (TB) mapped to multiple slots, and a method for configuring repetitive transmission. Through the method of the disclosure, an additional channel coding gain may be obtained, and the coverage of an uplink channel may be improved.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 3 illustrates DMRS patterns (type 1 and type 2) used for communication between a base station and a terminal in a 5G system according to embodiments of the present disclosure;

FIG. 7 illustrates an example of one TB processing over multi-slot PUSCH transmission (TBoMS) in a 5G system according to embodiments of the present disclosure;

FIG. 12 illustrates an example of a count-based TBoMS transmission method of one TB processing over multi-slot PUSCH repetition (TBoMS) according to embodiments of the present disclosure;

FIG. 13 illustrates an example of a count-based TBoMS transmission method of one TB processing over multi-slot PUSCH repetition (TBoMS) according to embodiments of the present disclosure;

DETAILED DESCRIPTION

Figure 1:
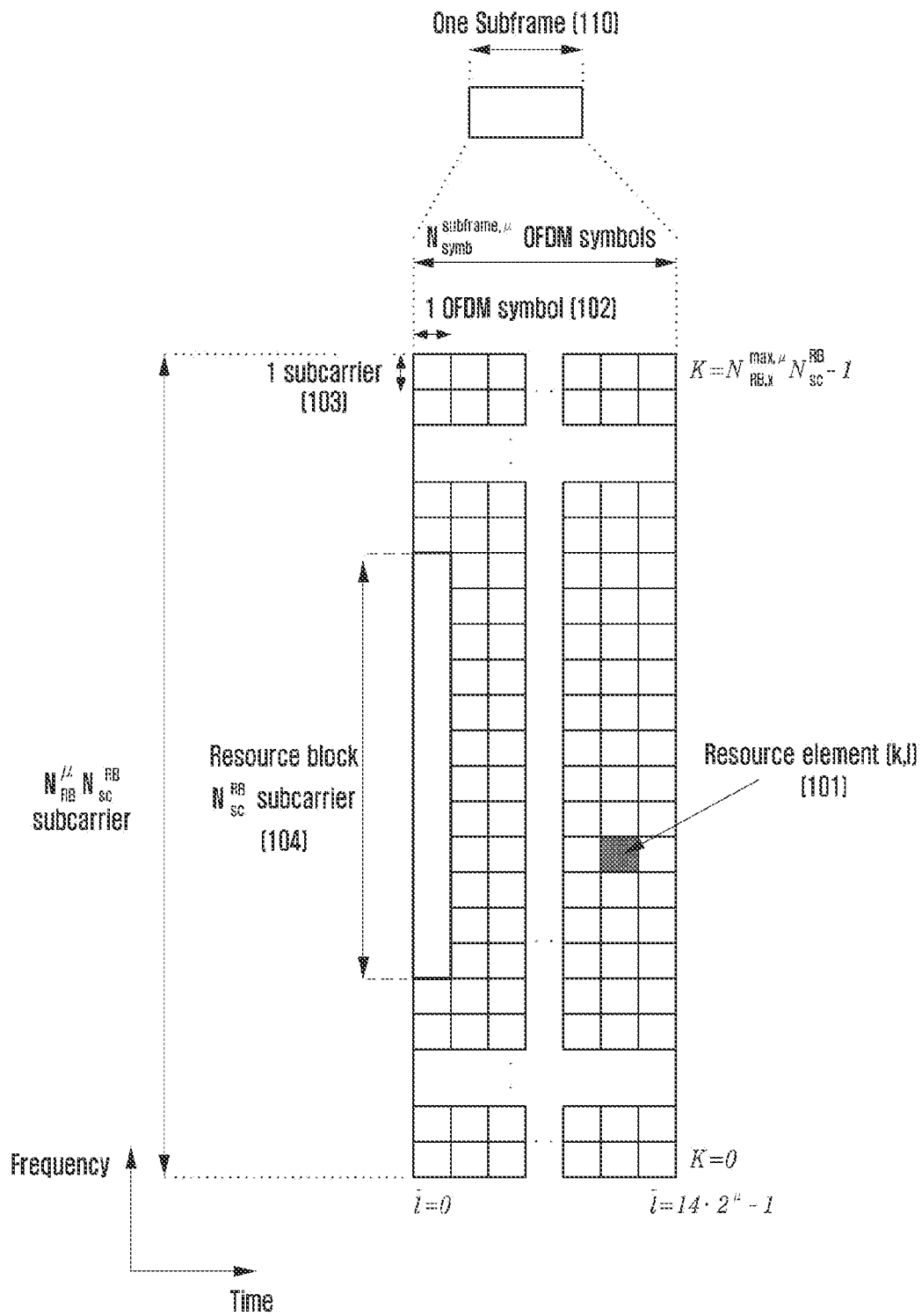
FIG. 1 illustrates the basic structure of a time-frequency domain, which is a radio resource domain in which data or a control channel is transmitted in a 5G system according to embodiments of the present disclosure.

Hereinafter, embodiments of the disclosure will be described in detail with reference to the accompanying drawings. In the following description of embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. Hereinafter, a method and an apparatus provided in the embodiment of the disclosure describe the embodiment of the disclosure as an example for improving PUSCH coverage, are not limited to each embodiment, and can be utilized for a frequency resource configuration method corresponding to another channel by using all of one or more embodiments provided in the disclosure or a combination of some embodiments. Accordingly, the embodiments of the disclosure may be applied through some modifications within a range that does not significantly deviate from the scope of the disclosure as determined by a person skilled in the art.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and IEEE 802.16e.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (eNodeB (eNB) or BS), and the DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, a 5G communication system may support services satisfying various requirements at the same time, so as to freely reflect various requirements of a user and a service provider. The services considered for the 5G communication system include enhanced mobile broadband (eMBB), massive machine-type communication (mMTC), ultra-reliability low latency communication (URLLC), and the like.

eMBB aims to provide a higher data transmission rate than a data transmission rate supported by the LTE, LTE-A, or LTE-Pro. For example, in the 5G communication system, eMBB may be able to provide a peak data rate of 20 Gbps in the DL and a peak data rate of 10 Gbps in the UL from the viewpoint of one base station. In addition, the 5G communication system may provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and devices to provide communication functions. In addition, since the terminals supporting mMTC are more likely to be positioned in shaded areas not covered by a cell, such as a basement of a building due to nature of services, the terminals require a wider coverage than other services provided by the 5G communication system. The terminals that support mMTC may be configured as inexpensive terminals and require very long battery lifetime, such as 10 to 16 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC may provide very low latency and very high reliability. For example, URLLC-supportive services need to meet an air interface latency of less than 0.5 milliseconds and simultaneously include requirements of a packet error rate of 10-5 or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the above 5G communication system (hereinafter, interchangeably used with 5G system) may be multiplexed in one system and may be transmitted. Here, the services may use different transmission/reception techniques and transmission/reception parameters in order to satisfy different requirements.

Hereinafter, the frame structure of a 5G system will be described in more detail with reference to the drawings.

FIG. 1 illustrates the basic structure of a time-frequency domain, which is a radio resource domain of a 5G system according to embodiments of the present disclosure.

Referring to FIG. 1, the horizontal axis represents a time domain, and the vertical axis represents a frequency domain. A basic unit of resources in the time-frequency domain may be a resource element (RE) 101. The resource element 101 may be defined by 1 orthogonal frequency division multiplexing (OFDM) symbol (or discrete Fourier transform spread OFDM (DFT-s-OFDM) symbol 102 in a time domain and 1 subcarrier 103 in a frequency domain. In the frequency domain, $N_{sc}^{RB}$ (for example, 12) consecutive REs may configure one resource block (RB) 104. In addition, $N_{symb}^{subframe}$ consecutive OFDM symbols in the time domain may configure one subframe 110.

Figure 2:
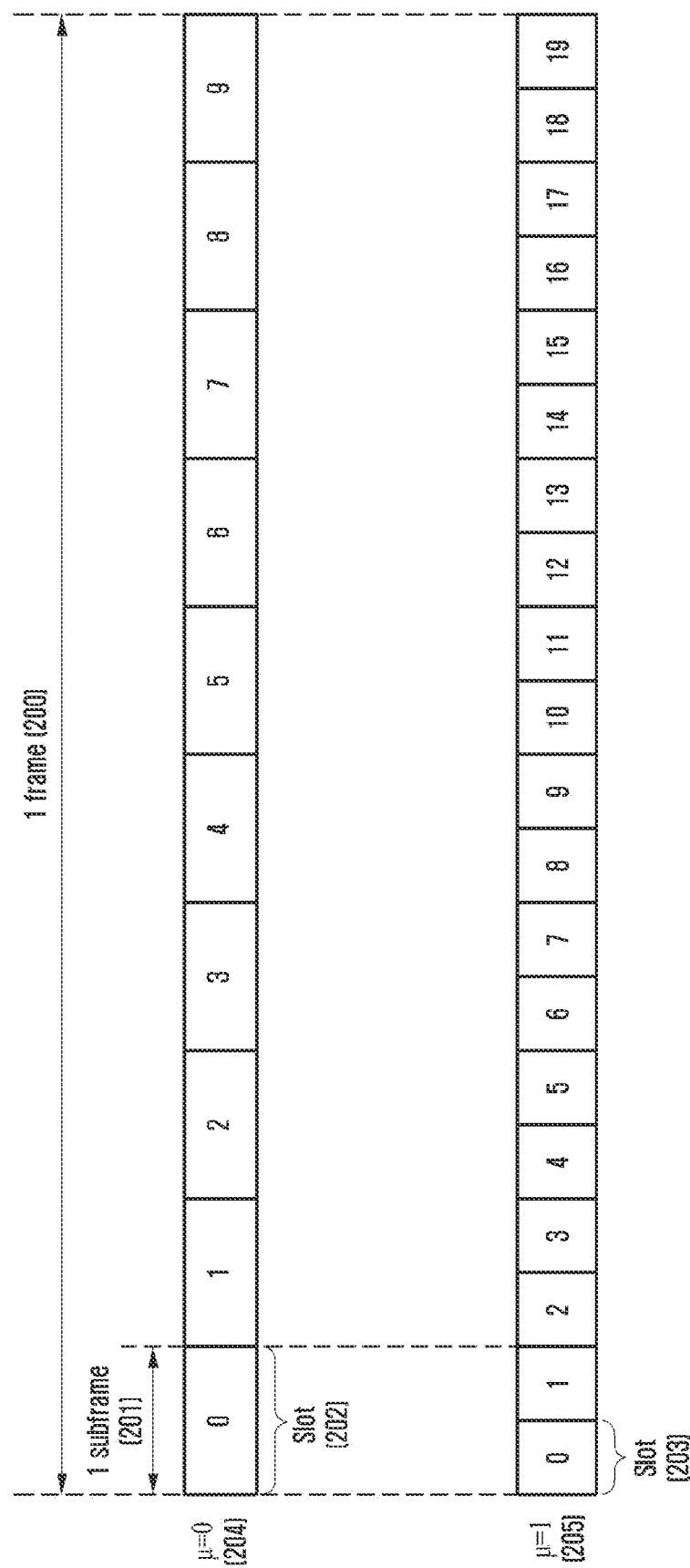
FIG. 2 illustrates a slot structure considered in a 5G system according to embodiments of the present disclosure.

FIG. 2 illustrates a slot structure considered in a 5G system according to embodiments of the present disclosure.

Referring to FIG. 2, an example of a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the number of symbols for one slot ($N_{symb}^{slot}$=14)). One subframe 201 may include one or multiple slots 202 and 203, and the number of slots 202 and 203 per one subframe 201 may differ according to configuration value p 204 or 205 for a subcarrier spacing.

In an example of FIG. 2, a case in which the subcarrier spacing configuration value is μ=0 (indicated by reference numeral 204) and μ=1 (indicated by reference numeral 205) is illustrated. In case that α=0 (indicated by reference numeral 204), one subframe 201 may include one slot 202, and in case that μ=1 (indicated by reference numeral 205), one subframe 201 may include two slots 203. That is, the number of slots per one subframe ($N_{slot}^{subframe,\mu}$) may differ according to a subcarrier spacing configuration value μ, and accordingly, the number of slots per one frame ($N_{slot}^{frame,\mu}$) may differ. According to each subcarrier spacing configuration μ, $N_{slot}^{subframe,\mu}$ and $N_{slot}^{frame,\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS), which is one of reference signals in the 5G system, will be described in detail. The DMRS may include several DMRS ports, and each port maintains orthogonality by using code division multiplexing (CDM) or frequency division multiplexing (FDM) so as not to generate interference. However, the term "DMRS" may be expressed in other terms depending on a user's intention and the purpose of using the reference signal. More specifically, the term "DMRS" is merely provided for specific examples to easily explain the technical content of the disclosure and to help the understanding of the disclosure, and is not intended to limit the scope of the disclosure. That is, it is obvious to those skilled in the art to which the disclosure belongs that it can be implemented even with a reference signal based on the technical idea of the disclosure.

FIG. 3 illustrates DMRS patterns (type1 and type2) used for communication between a base station and a terminal in a 5G system according to embodiments of the present disclosure.

In a 5G system, two DMRS patterns may be supported. Two DMRS patterns are illustrated in detail in FIG. 3. In FIG. 3, reference numerals 301 and 302 represent DMRS type 1, where 301 represents a one-symbol pattern and 302 represents a two-symbol pattern. DMRS type 1 of 301 or 302 of FIG. 3 is a DMRS pattern of a comb 2 structure and may be configured by two CDM groups, and different CDM groups may be FDMed.

In the one-symbol pattern of 301 of FIG. 3, two DMRS ports may be distinguished by applying CDM in a frequency to the same CDM group, and thus a total of four orthogonal DMRS ports may be configured. DMRS port IDs respectively mapped to the CDM groups are illustrated in reference numeral 301 of FIG. 3 (in a case of downlink, the DMRS port ID is indicated by being +1000 to the illustrated number). In the two-symbol pattern of reference numeral 302 of FIG. 3, four DMRS ports may be distinguished by applying CDM in time/frequency to the same CDM group, and thus a total of eight orthogonal DMRS ports may be configured. DMRS port IDs respectively mapped to the CDM groups are illustrated in reference numeral 302 of FIG. 3 (in a case of downlink, the DMRS port ID is indicated by being +1000 to the illustrated number).

DMRS type 2 of reference numeral 303 or 304 of FIG. 3 is a DMRS pattern of a structure in which frequency division-orthogonal cover code (FD-OCC) is applied to adjacent subcarriers in a frequency and may be configured by three CDM groups, and different CDM groups may be FDMed.

In the one-symbol pattern of 303 of FIG. 3, two DMRS ports may be distinguished by applying CDM in frequency to the same CDM group, and thus a total of six orthogonal DMRS ports may be configured. DMRS port IDs respectively mapped to the CDM groups are illustrated in reference numeral 303 of FIG. 3 (in a case of downlink, the DMRS port ID is indicated by being +1000 to the illustrated number). In the two-symbol pattern of 304 of FIG. 3, four DMRS ports may be distinguished by applying CDM in time/frequency to the same CDM group, and thus a total of 12 orthogonal DMRS ports may be configured. DMRS port IDs respectively mapped to the CDM groups are illustrated in reference numeral 304 of FIG. 3 (in a case of downlink, the DMRS port ID is indicated by being +1000 to the illustrated number).

As described above, in NR system, two different DMRS patterns (301 and 302 or 303 and 304 of FIG. 3) may be configured, and whether the DMRS pattern is the one-symbol pattern (301 and 303) or the adjacent two-symbol pattern (302 and 304) may also be configured.

In addition, in the NR system, not only a DMRS port number may be scheduled but also the number of CDM groups scheduled together for PDSCH rate matching may be configured and signaled. Further, in case of cyclic prefix based orthogonal frequency division multiplex (CP)-OFDM, both the above-described two DMRS patterns may be supported in DL and UL, and in case of discrete Fourier transform-spread-OFDM (DFT-S-OFDM), only DMRS type 1 is supported among the above-described DMRS patterns in UL. Further, an additional DMRS may be supported to be configurable. A front-loaded DMRS refers to a first DMRS that appears in the earliest symbol in time, and the additional DMRS refers to a DMRS that appears in a symbol after the front-loaded DMRS. In the NR system, the number of additional DMRSs may be configured from a minimum of zero to a maximum of three.

In addition, the same pattern as that of the front-loaded DMRS may be assumed when an additional DMRS is configured. More specifically, when information indicating whether the front-loaded DMRS is the above-described DMRS pattern type 1 or type 2, information indicating whether the DMRS pattern is the one-symbol pattern or the adjacent two-symbol pattern, and information on the number of CDM groups used with the DMRS port are indicated, in case that the additional DMRS is additionally configured, it may be assumed that the additional DMRS is configured with the same DMRS information as that of the front-loaded DMRS.

More specifically, the downlink DMRS configuration described above may be configured through RRC signaling as shown in Table 2 below.

TABLE 2

```
DMRS-DownlinkConfig ::= SEQUENCE {
  dmrs-Type (DMRS type configuration) ENUMERATED {type2} OPTIONAL, --
Need S
  dmrs-AdditionalPosition (additional DMRS OFDM symbol configuration)
ENUMERATED {pos0, pos1, pos3} OPTIONAL, -- Need S
  maxLength (1 symbol or 2 symbol DMRS pattern-related configuration )
ENUMERATED {len2.} OPTIONAL, -- Need S
    scramblingID0 (scrambling ID0) INTEGER (0. .65535) OPTIONAL, --
Need S
  scramblingID1 (scrambling ID1) INTEGER (0.65535) OPTIONAL, --
Need S
    phaseTrackingRS (PTRS configuration) SetupRelease { PTRS-
DownlinkConfig} OPTIONAL, -- Need M
  ...
}
```

In addition, the uplink DMRS configuration described above may be configured through RRC signaling as shown in Table 3 below.

TABLE 3

```
DMRS-UplinkConfig ::= SEQUENCE {
  dmrs-Type (DMRS type configuration) ENUMERATED {type2}
OPTIONAL, --Need S
  dmrs-AdditionalPosition (additional DMRS OFDM symbol configuration)
ENUMERATED {pos0, pos1, pos3} OPTIONAL, -- Need R
  phaseTrackingRS (PTRS configuration) SetupRelease { PTRS-UplinkConfig }
OPTIONAL, -- Need M
  maxLength (1 symbol or 2 symbol DMRS pattern-related configuration)
ENUMERATED {len2} OPTIONAL, -- Need S
  transformPrecodingDisabled SEQUENCE {
  scramblingID0 (scrambling ID0) INTEGER (0..65535) OPTIONAL, -- Need S
  scramblingID1 (scrambling ID0) INTEGER (0..65535) OPTIONAL, --Need S
  . . .
  } OPTIONAL, -- Need R
  transformPrecodingEnabled SEQUENCE {
  nPUSCH-Identity (cell ID for DFT-s-OFDM) INTEGER(0.. 1007)
OPTIONAL, -- Need S
  sequenceGroupHopping ENUMERATED {disabled}OPTIONAL, -- Need S
  sequenceHopping ENUMERATED {enabled} OPTIONAL, -- Need S
  ...
  } OPTIONAL, -- Need R
  ...
}
```

Figure 4:
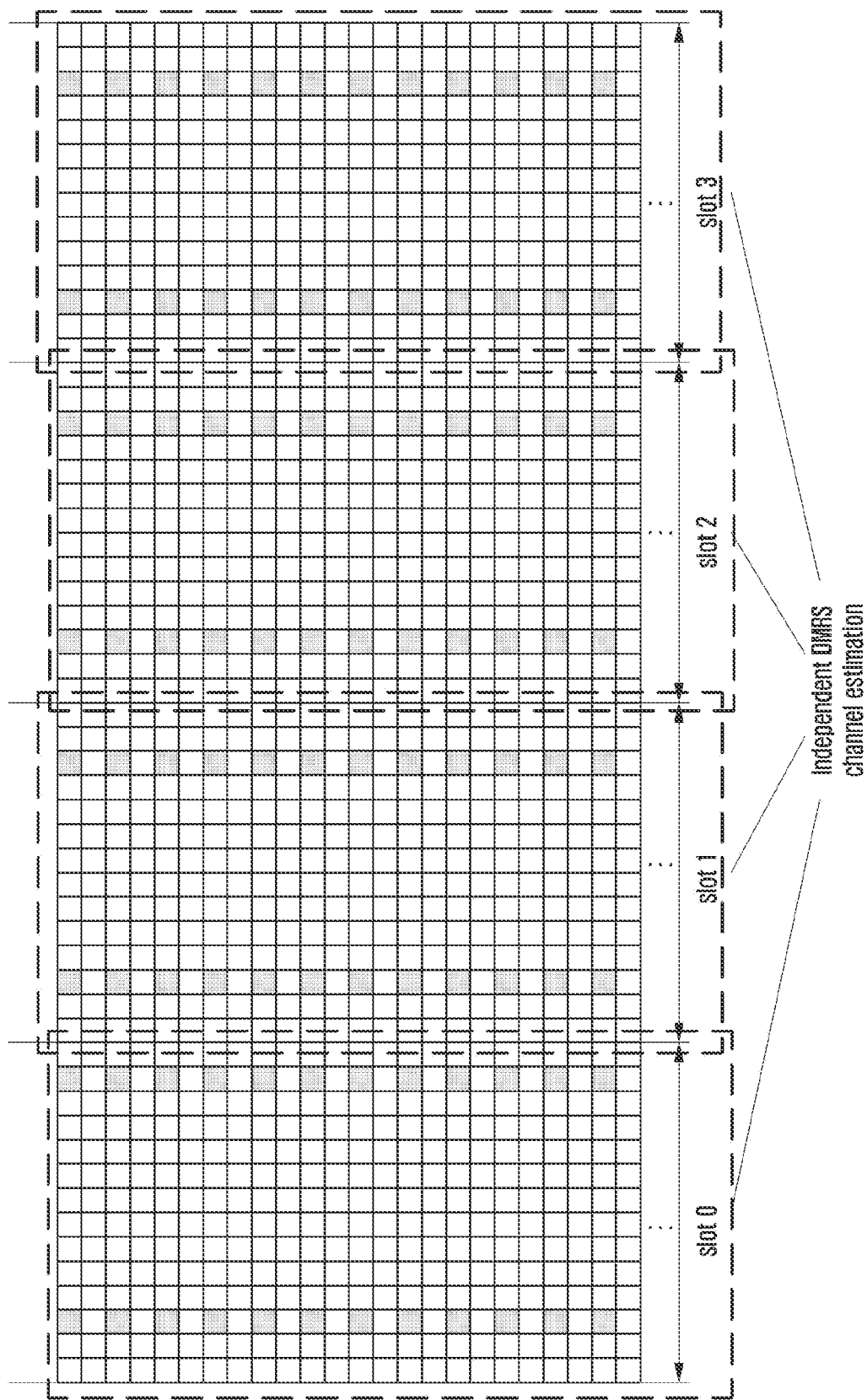
FIG. 4 illustrates an example of channel estimation using DMRS received through one PUSCH in a time band in a 5G system according to embodiments of the present disclosure.

FIG. 4 illustrates an example of channel estimation using DMRS received in one PUSCH in a time band in a 5G system according to embodiments of the present disclosure.

In connection with performing channel estimation for data decoding using the above-described DMRS, in a frequency band, channel estimation may be performed within a precoding resource block group (PRG), which is a corresponding bundling unit, by using bundling of physical resource blocks (PRBs) linked to a system band. In addition, in a time unit, channel estimation is performed under an assumption that only DMRS received via a single PUSCH has the same precoding.

Hereinafter, a method for time domain resource allocation for a data channel in a 5G communication system will be described. A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling).

The base station may configure, with regard to PDSCH, a table including up to maxNrofDL-Allocations=17 entries, and may configure, with regard to PUSCH, a table including up to maxNrofUL-Allocations=17. The time-domain resource allocation information may include PDCCH-to-PDSCH slot timing (corresponding to a time interval in slot units between a time point at which a PDCCH is received and a time point at which a PDSCH scheduled by the received PDCCH is transmitted, and marked as K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, time domain resource allocation information with regard to the PDSCH may be configured for the UE through an RRC signal as shown in Table 4 below.

TABLE 4

PDSCH-TimeDomainResourceAllocationLisl information element

PDSCH-TimeDomainResourceAllocationfist ::= SEQUENCE (SIZE(1..maxNrofDL-
Allocations)) OF PDSCH-TimeDomainResourceAllocation
PDSCH-TimeDomainResourceAllocation ::= SEQUENCE {
  k0 INTEGER(0..32) OPTIONAL, -- Need S
  (PDCCH-to-PDSCH timing, slot units)
  mappingType ENUMERATED {typeA, typeB},
  (PDSCH mapping type)
  startSymbol AndLength INTEGER (0..127)
  (Start symbol and length of PDSCH)
}

For example, time domain resource allocation information with regard to the PUSCH may be configured for the UE through an RRC signal as shown in Table 5 below.

TABLE 5

PUSCH-TimeDomainResourceAllocation information element

PUSCH-TimeDomainResourceAllocationList ::= SEQUENCE (SIZE( 1...maxNrofUL-
Allocations)) OF PUSCH-TimeDomainResourceAllocation
PUSCH-TimeDomainResourceAllocation ::= SEQUENCE {
  k2 INTEGER(0..32) OPTIONAL, -- Need S
  (PDCCH-to-PUSCH timing, slot units)
  mappingType ENUMERATED {typeA, typeB},
  (PUSCH mapping type)
  startSymbolAndLength INTEGER (0..127)
  (Start symbol and length of PUSCH)
}

The base station may transmit one of the entries in the table representing the time-domain resource allocation information to the UE via L1 signaling (e.g., downlink control information (DCI)) (e.g., may be indicated by a "time-domain resource allocation" field in DCI). The UE may acquire time-domain resource allocation information for the PDSCH or PUSCH based on the DCI received from the base station.

Hereinafter, transmission of an uplink data channel (physical uplink shared channel (PUSCH)) in a 5G system will be described in detail. PUSCH transmission may be dynamically scheduled by a UL grant in DCI or may be operated by a configured grant Type 1 or configured grant Type 2. Dynamic scheduling for PUSCH transmission may be indicated by DCI format 0_0 or 0_1.

The configured grant Type 1 PUSCH transmission may be semi-statically configured through reception of configuredGrantConfig including rrc-ConfiguredUplinkGrant of [Table 6] via higher layer signaling without receiving a UL grant in DCI. The configured grant Type 2 PUSCH transmission may be semi-persistently scheduled by UL grant in DCI after reception of configuredGrantConfig not including the rrc-ConfiguredUplinkGrant of [Table 6] via higher layer signaling. When PUSCH transmission is operated by a configured grant, parameters applied to PUSCH transmission may be applied through configuredGrantConfig, which is higher layer signaling of [Table 6], except for specific parameters (e.g., dataScramblingIdentityPUSCH, txConfig, codebookSubset, maxRank, scaling of UCI-OnPUSCH, etc.) provided by pusch-Config of [Table 7], which is higher layer signaling. For example, when the UE is provided with transformPrecoder in configuredGrantConfig, which is higher layer signaling of [Table 6], the UE may apply tp-pi2BPSK in the pusch-Config of [Table 7] with regard to PUSCH transmission operated by the configured grant.

TABLE 6

ConfiguredGrantConfig

ConfiguredGrantConfig ::= SEQUENCE {
  frequencyHopping ENUMERATED {intraSlot, intraSlot,} OPTIONAL, -- Need S,
  cg-DMRS-Configuration DMRS-UplinkConfig,
  mcs-Table ENUMERATED {qam256, qam64LowSE} OPTIONAL, -- Need S
  mcs-TableTransformPrecoder ENUMERATED {qam256, qam64LowSE}
OPTIONAL, -- Need S
  uci-OnPUSCH SetupRelease {CG-UCI-OnPUSCH } OPTIONAL, -- Need M
  resourceAllocation ENUMERATED { resourceAllocationType0, resourceAllocationType1,
dynamicSwitch },
  rbg-Size ENUMERATED {config2} OPTIONAL, -- Need S
  powerControlLoopToUse ENUMERATED {n0, n1},
  p0-PUSCH-Alpha P0-PLISCH-AlphaSetId,
  transformPrecoder ENUMERATED (enabled, disabled} OPTIONAL, -- Need S
  nrofHARQ-Processes INTEGER(1..17), TABLE 6-continued

| ConfiguredGrantConfig |
|---|

```
  repK ENUMERATED {nl, n2, n4, n8},
  repK-RV ENUMERATED {s1-0231, s2-0303, s3-00001} OPTIONAL, -- Need R
  periodicity ENUMERATED {
    sym2, sym7, sym1x14, sym2x14, sym4x14, sym5x14, sym8x14, sym10x14, sym17x14,
sym20x14,
    sym32x14, sym40x14, sym64x14, sym80x14, sym128x14, sym170x14, sym256x14,
sym320x14, sym512x14,
    sym640x14, sym1024x14, sym1280x14, sym2560x14, sym5120x14,
    sym6, symix12, sym2x12, sym4x12, sym5x12, sym8x12, sym10x12, sym17x12,
sym20x12, sym32x12,
    sym40x12, sym64x12, sym80x12, sym128x12, sym170x12, sym256x12, sym320x12,
sym512x12, sym640x12,
    sym1280x12, sym2560x12
  },
  configuredGrantTimer INTEGER (1..64) OPTIONAL, -- Need R
  rrc-ConfiguredUplinkGrant SEQUENCE {
  timeDomainOffset INTEGER (0..5119),
  timeDomainAllocation INTEGER (0..16),
  frequencyDomainAllocation BIT STRING (SIZE(18)),
  antennaPort INTEGER (0..31),
  dmrs-Seqinitialization INTEGER (0..1) OPTIONAL, -- Need R
  precodingAndNumber0fLayers INTEGER (0..63),
  srs-Resourceindicator INTEGER (0..16) OPTIONAL, -- Need R
  mcsAndTBS INTEGER (0..31),
  frequencyHoppingOffset INTEGER (1... maxNrofPhysicalResoureeBlocks-1)
OPTIONAL, -- Need R
  pathlossReferenceIndex INTEGER (0..maxNrofPUSCH-PathlossRefereneeRSs-1),
  ...
  } OPTIONAL, -- Need R
  ...
}
```

Next, a PUSCH transmission method will be described. A DMRS antenna port for PUSCH transmission may be the same as an antenna port for SRS transmission. PUSCH transmission may be based on a codebook-based transmission method and a non-codebook-based transmission method, respectively, depending on whether the value of txConfig in pusch-Config of [Table 7], which is higher layer signaling, is "codebook" or "nonCodebook." As described above, PUSCH transmission may be dynamically scheduled through DCI format 0_0 or 0_1, and may be semi-statically configured by a configured grant. When the UE is indicated to schedule PUSCH transmission through DCI format 0_0, the UE may perform beam configuration for PUSCH transmission by using pucch-spatialRelationInfoID corresponding to the UE-specific (UE-dedicated) PUCCH resource having the lowest ID in an uplink bandwidth part (BWP) activated in a serving cell. Here, PUSCH transmission may occur based on a single antenna port. The UE does not expect scheduling for PUSCH transmission through DCI format 0_0 within a BWP in which the PUCCH resource including the pucch-spatialRelationInfo is not configured. When the UE is not configured with txConfig in pusch-Config of [Table 7], the UE may not be expected to be scheduled by DCI format 0_1.

| PUSCH-Coqfig |
|---|

```
PUSCH-Config ::= SEQUENCE {
  dataScramblingidentityPUSCH INTEGER (0..1023) OPTIONAL, -- Need S
  txConfig ENUMERATED {codebook, nonCodebook} OPTIONAL, -- Need S
  dmrs-UplinkForPUSCH-MappingTypeA SetupRelease {DMRS-UplinkConfig } OPTIONAL,
-- Need M
  dmrs-UplinkForPUSCH-MappingTypeB SetupRelease {DMRS-UplinkConfig } OPTIONAL,
-- Need M
  pusch-PowerControl PUSCH-PowerControl OPTIONAL, -- Need M
  frequencyHopping ENUMERATED {intraSlot, interSlot}OPTIONAL, -- Need S
  frequencyHoppingOffsetLists SEQUENCE (SIZE (1.4)) OF INTEGER (1..
maxNrofPhysicalResourceBlocks-1) OPTIONAL, -- Need M
  resourceAllocation ENUMERATED {resourceAllocationType0, resourceAllocationType1,
dynamicSwitch},
  pusch-TimeDomainAllocationList SetupRelease { PUSCH-
TimeDomainResourceAllocationList }OPTIONAL, -- Need M
  pusch-AggregationFactor ENUMERATED {n2, n4, n8} OPTIONAL, -- Need S
  mcs-Table ENUMERATED {qam256, qam64LowSE} OPTIONAL, -- Need S
  mcs-TableTransforinPrecoder ENUMERATED {qam256, qam64LowSE} OPTIONAL, -
- Need S
    transformPrecoder ENUMERATED {enabled, disabled} OPTIONAL, -- Need S
    codebookSubset ENUMERATED {fullyAndPartialAndNonCoherent,
partialAndNonCoherent,nonCoherent}
        OPTIONAL, -- Cond codebookBased
    maxRank INTEGER (1..4) OPTIONAL, -- Cond codebookBased
    rbg-Size ENUMERATED {config2} OPTIONAL, -- Need S
```

-continued

PUSCH-Coqfig uci-OnPUSCH SetupRelease {UCI-OnPUSCH} OPTIONAL, -- Need M
tp-pi2BPSK ENUMERATED {enabled} OPTIONAL, -- Need S
...
}

Next, codebook-based PUSCH transmission will be described. Codebook-based PUSCH transmission may be dynamically scheduled through DCI format 0_0 or 0_1, and may be configured to operate semi-statically by a configured grant. When the codebook-based PUSCH is dynamically scheduled by DCI format 01 or is configured semi-statically by a configured grant, the UE may determine a precoder for PUSCH transmission based on an SRS resource indicator (SRI), a transmission precoding matrix indicator (TPMI), and a transmission rank (the number of PUSCH transport layers). Here, the SRI may be given through a field SRS resource indicator in DCI or may be configured through srs-ResourceIndicator, which is higher layer signaling. The UE may be configured with at least one SRS resource during codebook-based PUSCH transmission, and may be configured with up to two SRS resources for example. When the UE is provided with an SRI through DCI, an SRS resource indicated by the corresponding SRI may denote an SRS resource corresponding to the SRI among SRS resources transmitted before a PDCCH including the corresponding SRI. In addition, the TPMI and transmission rank may be given through field precoding information and number of layers in DCI, or may be configured through precodingAndNumberOfLayers, which is higher layer signaling. The TPMI may be used to indicate a precoder applied to PUSCH transmission.

A precoder to be used for PUSCH transmission may be selected from an uplink codebook having the same number of antenna ports as the value of nrofSRS-Ports in SRS-Config, which is higher layer signaling. In codebook-based PUSCH transmission, the UE may determine a codebook subset based on the TPMI and codebookSubset in pusch-Config, which is higher layer signaling. The codebookSubset in pusch-Config, which is higher layer signaling, may be configured as one of "fullyAndPartialAndNonCoherent," "partialAndNonCoherent," or "nonCoherent" based on UE capability reported by the UE to the base station.

When the UE has reported "partialAndNonCoherent" via UE capability, the UE may not expect that the value of codebookSubset, which is higher layer signaling, is configured as "fullyAndPartialAndNonCoherent." In addition, when the UE has reported "nonCoherent" via UE capability, the UE may not expect that the value of codebookSubset, which is higher layer signaling, is configured as "fullyAndPartialAndNonCoherent" or "partialAndNonCoherent." When nrofSRS-Ports in SRS-ResourceSet, which is higher layer signaling, indicates two SRS antenna ports, the UE may not expect that the value of codebookSubset, which is higher layer signaling, is configured as "partialAndNonCoherent."

The UE may be configured with one SRS resource set in which the value of usage in the SRS-ResourceSet, which is higher layer signaling, is configured as "codebook," and one SRS resource in the corresponding SRS resource set may be indicated through the SRI. If multiple SRS resources are configured in the SRS resource set in which the value of usage in the SRS-ResourceSet, which is higher layer signaling, is configured as "codebook," the UE may expect that the values of nrofSRS-Ports in the SRS-Resource, which is higher layer signaling, are configured as the same value with respect to all SRS resources.

The UE may transmit, to the base station, one or multiple SRS resources included in the SRS resource set in which the value of usage is configured as "codebook" according to higher layer signaling, and the base station may select one of the SRS resources transmitted by the UE, and may instruct the UE to perform PUSCH transmission by using transmission beam information of the corresponding SRS resource. Here, in the codebook-based PUSCH transmission, the SRI may be used as information for selection of the index of one SRS resource, and may be included in the DCI. Additionally, the base station may include, in the DCI, information indicating a rank and a TPMI to be used by the UE for PUSCH transmission, and may transmit the same. The UE may perform PUSCH transmission by applying a precoder indicated by a rank and a TPMI indicated based on the transmission beam of the SRS resource, by using the SRS resource indicated by the SRI.

Next, non-codebook-based PUSCH transmission will be described. Non-codebook-based PUSCH transmission may be dynamically scheduled through DCI format 0_0 or 0_1, and may be semi-statically operated by a configured grant. When at least one SRS resource is configured in an SRS resource set in which the value of usage in the SRS-ResourceSet, which is higher layer signaling, is configured as "nonCodebook," the UE may be scheduled with non-codebook-based PUSCH transmission through DCI format 0_1.

With regard to an SRS resource set in which the value of usage in the SRS-ResourceSet, which is higher layer signaling, is configured as "nonCodebook," the UE may be configured with a non-zero power (NZP) CSI-RS resource, which is associated with one SRS resource set. The UE may perform calculation of a precoder for SRS transmission by measuring the NZP CSI-RS resource configured in association with the SRS resource set. When the difference between the last received symbol of an aperiodic NZP CSI-RS resource associated with the SRS resource set and the first symbol of aperiodic SRS transmission in the UE is less than a specific symbol (e.g., 42 symbols), the UE may not expect information on the precoder for SRS transmission to be updated.

When the value of resourceType in the SRS-ResourceSet, which is higher layer signaling, is configured to be "aperiodic," the NZP CSI-RS associated with the SRS-ResourceSet may be indicated by SRS request, which is a field in DCI format 0_1 or 1_1. Here, a case in which the NZP CSI-RS resource associated with the SRS-ResourceSet is an aperiodic NZP CSI-RS resource and the value of the field SRS request in DCI format 0_1 or 1_1 is not "00" may indicate that the NZP CSI-RS associated with the SRS-ResourceSet exists. Here, the DCI may not indicate cross carrier or cross BWP scheduling. In addition, when the value of the SRS request indicates the existence of the NZP CSI-RS, the corresponding NZP CSI-RS may be located in a slot in which a PDCCH including the SRS request field is transmitted. Here, TCI states configured via the scheduled subcarrier may not be configured to be QCL-TypeD.

If a periodic or semi-persistent SRS resource set is configured, the NZP CSI-RS associated with the SRS resource set may be indicated through associatedCSI-RS in the SRS-ResourceSet, which is higher layer signaling. With regard to non-codebook-based transmission, the UE may not expect that spatialRelationInfo, which is higher layer signaling for SRS resource, and associatedCSI-RS in SRS-ResourceSet, which is higher layer signaling, are configured together.

When the UE is configured with multiple SRS resources, the UE may determine a precoder to be applied to PUSCH transmission and a transmission rank, based on the SRI indicated by the base station. Here, the SRI may be indicated through a field SRS resource indicator in DCI or may be configured through srs-Resourceindicator, which is higher layer signaling. As in the above-described codebook-based PUSCH transmission, when the UE is provided with an SRI through DCI, an SRS resource indicated by the SRI may denote an SRS resource corresponding to the SRI among SRS resources transmitted before the PDCCH including the SRI. The UE may use one or multiple SRS resources for SRS transmission, and the maximum number of SRS resources capable of simultaneous transmission from the same symbol in one SRS resource set may be determined by UE capability reported by the UE to the base station. Here, the SRS resources simultaneously transmitted by the UE may occupy the same RB. The UE may configure one SRS port for each SRS resource. Only one SRS resource set in which the value of usage in the SRS-ResourceSet, which is higher layer signaling, is configured to be "nonCodebook" may be configured, and up to four SRS resources for non-codebook-based PUSCH transmission may be configured.

The base station may transmit one NZP-CSI-RS associated with the SRS resource set to the UE, and the UE may perform calculation of a precoder to be used for transmission of one or multiple SRS resources in the corresponding SRS resource set based on a result of measurement at the time of reception of the NZP-CSI-RS. The UE may apply the calculated precoder when transmitting, to the base station, one or multiple SRS resources in the SRS resource set in which usage is configured to be "nonCodebook," and the base station may select one or multiple SRS resources among the received one or multiple SRS resources. Here, in non-codebook-based PUSCH transmission, the SRI may indicate an index capable of expressing one or a combination of multiple SRS resources, and the SRI may be included in the DCI. Here, the number of SRS resources indicated by the SRI transmitted by the base station may be the number of transmission layers of the PUSCH, and the UE may perform PUSCH transmission by applying a precoder applied for SRS resource transmission to each layer.

Next, PUSCH repetitive transmission will be described. When the UE is scheduled with PUSCH transmission in DCI format 0_1 in a PDCCH including CRC scrambled by C-RNTI, MCS-C-RNTI, or CS-RNTI, if the UE is configured with higher layer signaling pusch-AggregationFactor, the same symbol allocation may be applied in consecutive slots equal to the pusch-AggregationFactor, and PUSCH transmission may be limited to single rank transmission. For example, the UE may repeat the same transport block (TB) in consecutive slots equal to pusch-AggregationFactor, and may apply the same symbol allocation to each slot. [Table 8] shows the redundancy version applied to PUSCH repetitive transmission for each slot. If the UE is scheduled with PUSCH repetitive transmission in DCI format 0_1 in multiple slots, and if at least one symbol, in the slots in which PUSCH repetitive transmission is performed according to information of higher layer signaling tdd-UL-DL-ConfigurationCommon or tdd-UL-DL-ConfigurationDedicated, is indicated as a downlink symbol, the UE may not perform PUSCH transmission in a slot in which the corresponding symbol is located.

TABLE 8

| $rv_{id}$ indicated by the DCI scheduling the PUSCH | $rv_{id}$ to be applied to $n^{th}$ transmission occasion | | | |
|---|---|---|---|---|
| | n mode 4 = 0 | n mode 4 = 1 | n mode 4 = 2 | n mode 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. In the 5G system, two types of repetitive transmission methods of the uplink data channel are supported: PUSCH repetition type A and PUSCH repetition type B. The UE may be configured with one of PUSCH repetition types A and B via higher layer signaling.

PUSCH Repetition Type A

As described above, the start symbol and the symbol length of the PUSCH are determined in one slot by a time-domain resource allocation method, and a base station may transmit the number of repetitive transmissions to a UE via higher layer signaling (e.g., RRC signaling) or layer 1 (L1) signaling (e.g., DC).

The UE may perform repetitive transmission, in consecutive slots, of a PUSCH having the same start symbol and length as that of the configured PUSCH, based on the number of repetitive transmissions received from the base station. Here, if at least one symbol among symbols in a slot configured for downlink by the base station to the UE or in a slot for PUSCH repetitive transmission configured for the UE is configured for downlink, the UE may omit PUSCH transmission in the corresponding slot. That is, the UE may not perform PUSCH transmission although the PUSCH transmission is included in the number of PUSCH repetitive transmissions.

PUSCH Repetition Type B

As described above, the start symbol and length of the PUSCH are determined in one slot by the time-domain resource allocation method, and the base station may transmit the number of repetitive transmissions (numberofrepetitions) to the UE via higher layer signaling (e.g., RRC signaling) or L1 signaling (e.g., DCI).

Based on the start symbol and length of the configured PUSCH, nominal repetition of the PUSCH may be determined as follows. Here, nominal repetition may refer to a resource of a symbol configured by the base station for PUSCH repetitive transmission, and the UE may determine a resource usable for uplink in the configured nominal repetition. Here, a slot in which the nth nominal repetition starts may be given by $$K_s + \left\lfloor \frac{S + n \cdot L}{N_{symb}^{slot}} \right\rfloor,$$

and a symbol from which nominal repetition starts in the start slot may be given by mod(S+n·L,$N_{symb}^{slot}$). A slot in which the nth nominal repetition ends may be given by $$K_s + \left\lfloor \frac{S+(n+1)\cdot L - 1}{N_{symb}^{slot}} \right\rfloor,$$

and a symbol from which nominal repetition ends in the last slot may be given by mod(S+(n+1)·L−1,$N_{symb}^{slot}$). Here, n=0, . . . , number of repetitions-1, S may indicate the start symbol of the configured PUSCH, and L may indicate the symbol length of the configured PUSCH. $K_s$ may indicate a slot in which PUSCH transmission starts, and $N_{symb}^{slot}$ may denote the number of symbols for one slot.

The UE determines an invalid symbol for PUSCH repetition type B. A symbol configured for downlink by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). As an example, the higher layer parameter (e.g., InvalidSymbolPattern) may provide a symbol-level bitmap spanning one or two slots so that invalid symbols may be configured. In the bitmap, "1" represents an invalid symbol. Additionally, the period and pattern of the bitmap may be configured through a higher layer parameter (e.g., periodicityAndPattern). If a higher layer parameter (e.g., InvalidSymbolPattern) is configured and InvalidSymbolPatternindicator-ForDCIFormat0_1 or InvalidSymbolPatternIndicator-ForDCIFormat0_2 parameter indicates 1, the UE may apply an invalid symbol pattern, and if the parameter indicates 0, the UE may not apply the invalid symbol pattern. If a higher layer parameter (e.g., InvalidSymbolPattern) is configured and the InvalidSymbolPatternIndicator-ForDCIFormat0_1 or InvalidSymbolPatternindicator-ForDCIFormat0_2 parameter is not configured, the UE may apply an invalid symbol pattern.

After the invalid symbol is determined in each nominal repetition, the UE may consider symbols except for the determined invalid symbol as valid symbols. If one or more valid symbols are included in each nominal repetition, the nominal repetition may include one or more actual repetitions. Here, each actual repetition may refer to a symbol actually used for PUSCH repetitive transmission among symbols configured by the configured nominal repetition, and may include a consecutive set of valid symbols that can be used for PUSCH repetition type B in one slot. The UE may omit transmission of the actual repetition when the actual repetition with one symbol is configured as valid except for a case in which the symbol length L=1 of the configured PUSCH. A redundancy version is applied according to a redundancy version pattern configured for each nth actual repetition.

Figure 5:
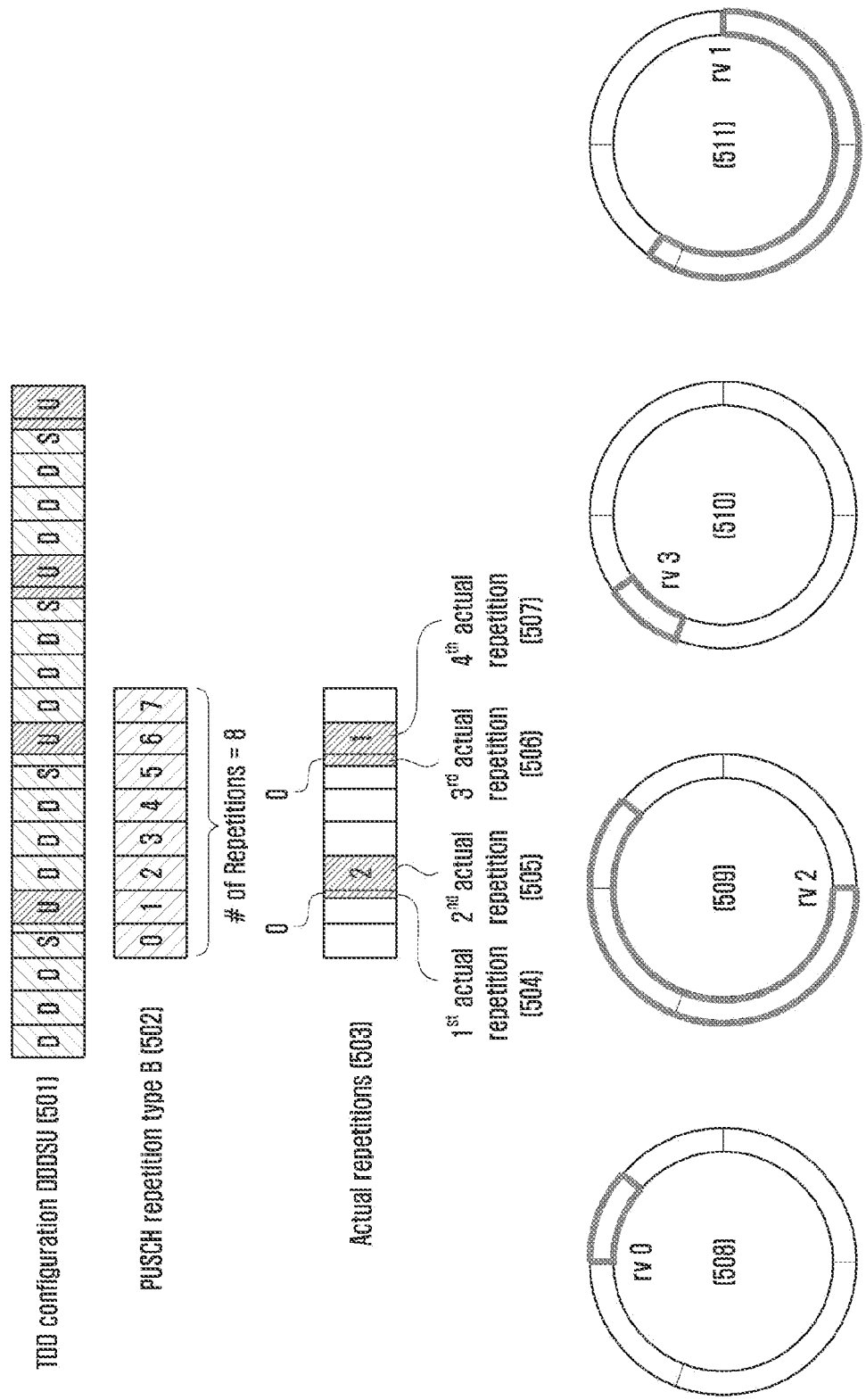
FIG. 5 illustrates an example of PUSCH repetition type B in a 5G system according to embodiments of the present disclosure.

FIG. 5 illustrates an example of PUSCH repetition type B in a 5G system according to embodiments of the present disclosure. The frame structure configuration of time division duplexing (TDD) for a UE may be configured by 3 downlink slots, 1 special/flexible slot, and 1 uplink slot. Here, when the special/flexible slot may be configured by 11 downlink symbols and 3 uplink symbols, the initial transmission slot corresponds to the 3rd in uplink transmission. When the UE may be configured with the uplink data channel having a start symbol index of 0, the uplink data channel length of 14, and the number of repetitive transmissions being configured as repK=8, nominal repetition is indicated in 8 consecutive slots from the initial transmission slot (indicated by reference numeral 502). Thereafter, the UE determines a symbol, which is configured as a downlink symbol in the frame structure 501 of the TDD system in each nominal repetition, as an invalid symbol, and when the valid symbols are configured by one or more consecutive symbols in one slot, the valid symbols may be configured as actual repetition and transmitted (indicated by reference numeral 503).

Accordingly, a total of repK_actual=4 PUSCHs may be actually transmitted. Here, when repK-RV is configured as 0-2-3-1, the RV in the PUSCH of a first resource 504 for actual transmission is 0, and the RV in the PUSCH of a second resource 505 for actual transmission is 2, the RV in the PUSCH of a third resource 506 for actual transmission is 3, and the RV in the PUSCH of a fourth resource 507 for actual transmission is 1. Here, only PUSCH having the RV value of 0 and the RV value of 3 has a value that can be decoded by itself. In a case of the first resource 504 and the third resource 506, the PUSCH transmission occurs only in three symbols, the symbol length of which are much smaller than the actually configured length of symbols (14 symbols), and thus bit lengths 508 and 510 subject to rate matching are smaller than bit lengths 509 and 511 calculated by the configuration.

Figure 6:
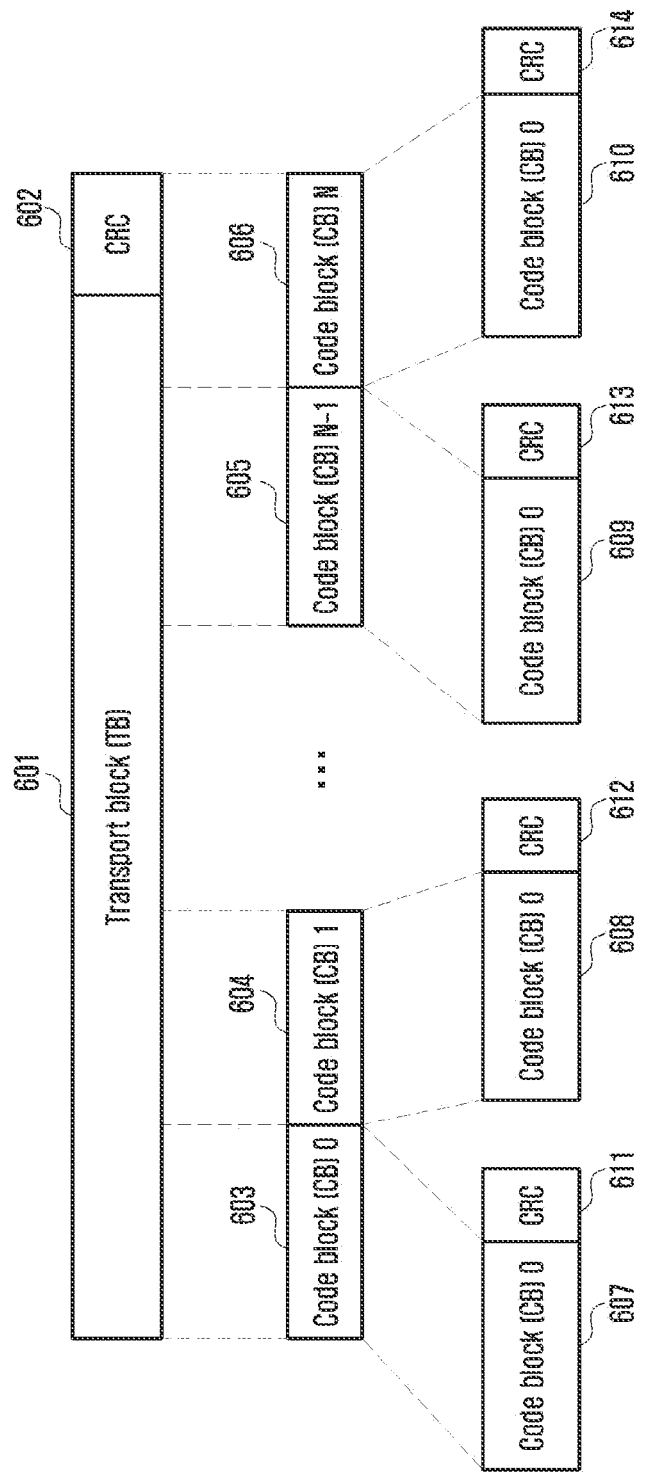
FIG. 6 illustrates an example of a process in which one transport block (TB) is divided into a plurality of code blocks and a CRC is added thereto in a 5G communication system according to embodiments of the present disclosure.

FIG. 6 illustrates an example of a process in which one transport block (TB) is divided into a plurality of code blocks (CBs) and a CRC is added thereto in a 5G communication system according to embodiments of the present disclosure.

Referring to FIG. 6, a CRC 602 may be added to the last part or the first part of one transport block (TB) 601 to be transmitted in an uplink or a downlink. The CRC 602 may have 17 bits, 25 bits, or a fixed number of bits, or may have a variable number of bits depending on channel conditions, and may be used to determine whether channel coding is successful. A block obtained by adding the CRC 602 to the TB 601 may be divided into a plurality of code blocks (CBs) 603, 604, 605, and 606. The divided code blocks (CBs) may have a predetermined maximum size, and in this case, the last code block (CB) 606 may be smaller in size than those of other code blocks 603, 604, and 605. This is only given as an example, and according to another example, the last code block (CB) 606 may have a length adjusted to be the same as that of the other code blocks 603, 604, and 605 by adding zeros, random values, or ones into the last code block (CB) 606.

In addition, CRCs 611, 612, 613, and 614 may be added to the code blocks (CBs) 607, 608, 609, and 610, respectively. The CRC may have 17 bits, 24 bits, or a fixed number of bits, and may be used to determine whether channel coding is successful. The TB 601 and cyclic generator polynomial may be used in order to generate the CRC 602, and the cyclic generator polynomial may be defined in various methods. For example, if it is assumed that cyclic generator polynomial gCRC24A (D)=D24+D23+D18+D18+D14+D11+D10+D7+D6+D5+D4+D3+D+1 for a 24 bit CRC, and L=24, with regard to TB data $a_0$, $a_1$, $a_2$, $a_3$, . . . , $a_{A-1}$, CRC $p_1$, $p_2$, . . . , $p_{L-1}$ may be a value in which the remainder becomes zero by dividing $_0D^{A+23}$+ $a_1 D^{A+22}$+ . . . +$a_{A-1}D^{24}$+$p_0D^{23}$+$p_1D^{22}$+ . . . +$p_{22}D^1$+$p_{23}$ by gCRC24A(D), and may determine $p_1$, $p_2$, . . . , $p_{L-1}$. In the above example, the CRC length "L" is assumed to be 24 as an example, but the CRC length L may be determined to have different lengths, such as 12, 17, 24, 32, 40, 48, 64, and the like. Through this process, the CRC is added to the TB, and then the TB having CRC added thereto (TB+CRC) may be divided into N CBs 603, 604, 605, and 606.

CRCs 611, 612, 613, and 614 may be added to each of the divided CBs 603, 604, 605, and 606. The CRC added to the CB may have a different length than that of the CRC added to the TB or may use a different cyclic generator polynomial to generate CRC. In addition, the CRC 602 added to the TB and the CRCs 611, 612, 613, and 614 added to the code block (CB) may be omitted depending on a code block (CB) type to be applied to the code block (CB). For example, if LDPC codes other than turbo codes are applied to code blocks (CBs), CRCs 611, 612, 613, and 614 to be inserted for each code block may be omitted. However, even if the LDPC is applied, the CRCs 611, 612, 613, and 614 may be added to the code block (CB) as it is. In addition, CRC may be added or omitted even if a polar code is used. As described above in FIG. 6, the maximum length of one code block (CB) is determined according to the type of channel coding applied to a TB to be transmitted, and the TB and CRC, which is added to the TB, are divided into code blocks according to the maximum length of the code block (CB). In the conventional LTE system, CRC for CB is added to the divided CB, data bits and the CRC of the CB are encoded with a channel code, and thus coded bits are determined and a number of bits, which perform predetermined rate matching (RM) to each of coded bits, have been determined.

Hereinafter, a method for calculating a transport block size (TBS) in a 5G system will be described in detail.

$N_{RE}'$ the number of REs assigned to PUSCH mapping in one PRB in the allocated resource, is calculated. $N_{RE}'$ may be calculated by $N_{sc}^{RB} \times N_{symb}^{sh} - N_{DMRS}^{PRB} - N_{oh}^{PRB}$/Here, $N_{sc}^{RB}$ is 12, and $N_{symb}^{sb}$ may represent the number of OFDM symbols allocated to the PUSCH. $N_{DMRS}^{PRB}$ is the number of REs in one PRB occupied by DMRSs of the same CDM group. $N_{oh}^{PRB}$ is the number of REs occupied by the overhead in one PRB, which is configured via higher signaling, and may be configured as one of 0, 6, 12, or 18. Thereafter, $N_{RE}$, the total number of REs, allocated to the PDSCH may be calculated. $N_{RE}$ is calculated by $\min(166, N_{RE}') \times n_{PRB}$, and $n_{PRB}$ denotes the number of PRBs allocated to the UE. The number of temporary information bits, $N_{info}$, may be calculated by $N_{RE} \times R \times Q_m \times v$. Here, R is a code rate, $Q_m$ is a modulation order, and information of the value may be transferred using MCS bitfield and a predetermined table of DCI. In addition, v is the number of assigned layers. If $N_{info} \leq 3824$, TBS may be calculated through process below. Otherwise, TBS may be calculated through stage 4. $N_{info}'$ may be calculated by the equation of $$N_{info} = \max\left(24, 2^n \times \left\lfloor \frac{N_{info}}{2^n} \right\rfloor\right) \text{ and } n = \max(3, \lfloor \log_2(N_{info}) \rfloor - 6).$$

TBS may be determined as a value, which is the closest to $N_{info}'$ among values equal to or larger than $N_{info}'$ in Table 9 below.

TABLE 9

| Index | TBS |
|---|---|
| 1 | 24 |
| 2 | 32 |
| 3 | 40 |
| 4 | 48 |
| 5 | 56 |
| 6 | 64 |

TABLE 9-continued

| Index | TBS |
|---|---|
| 7 | 72 |
| 8 | 80 |
| 9 | 88 |
| 10 | 96 |
| 11 | 104 |
| 17 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |

TABLE 9-continued

| Index | TBS |
| --- | --- |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info} > 3824$, $N_{info}'$ may be calculated by the equation of $$N_{info}^t = \max\left(3840, 2^n \times \text{round}\left(\frac{N_{info} - 20}{2^n}\right)\right) \text{ and } n = \lfloor \log_2(N_{info} - 24) \rfloor - 5.$$

TBS can be determined through the value of $N_{info}'$ and the following [pseudo-code 1]. Here, "C" corresponds to the number of code blocks CB included in one TB:

[Start Pseudo-code 1]

if $R \le \frac{1}{4}$ $$\text{TBS} = 8 \cdot C \cdot \left\lceil \frac{N_{info}' + 24}{8 \cdot C} \right\rceil - 24, \text{ where } C = \left\lceil \frac{N_{info}' + 24}{3816} \right\rceil$$

else if $N_{info}' > 8424$ $$\text{TBS} = 8 \cdot C \cdot \left\lceil \frac{N_{info}' + 24}{8 \cdot C} \right\rceil - 24, \text{ where } C = \left\lceil \frac{N_{info}' + 24}{8424} \right\rceil$$

else $$\text{TBS} = 8 \cdot \left\lceil \frac{N_{info}' + 24}{8} \right\rceil - 24$$

end if
end if

[End Pseudo-code 1].

FIG. 7 illustrates TB processing over multi-slot (TBoMS) PUSCH transmission in a 5G system according to embodiments of the present disclosure.

One TB 701 may be allocated to multiple slots 702, 703, 704, and 705, and transmitted. Here, it is possible to reduce a CRC ratio, obtain a low code rate, obtain a channel coding gain, and improve channel coverage by allocating one TB to the resources of the multiple slots 702, 703, 704, and 705 instead of allocating small amount of multiple TBs thereto. Further, referring to FIG. 7, as a time domain resource allocation method for TBoMS PUSCH transmission, a method for allocating time domain resources like PUSCH repetition type A (indicated by reference numeral 706) and a method for allocating time domain resources like PUSCH repetition type B (indicated by reference numeral 707) may be applied. When resource allocation to PUSCH for TBoMS is performed like PUSCH repetition type A, the PUSCH may be transmitted to multiple slots, each of which has the same symbol resource. On the other hand, when time domain resources are allocated to PUSCH for TBoMS like PUSCH repetition type B, resource allocation may be performed like case 0 708, case 1 709, case 2 710 according to the configured symbol length L through higher layer signaling and L1 signaling.

The disclosure describes a repetitive transmission configuration method when PUSCH transmission in which one TB is allocated to multiple slots in a 5G communication system is configured and a method for limiting the maximum number of transmittable slots. In addition, a method for improving PUSCH transmission and repetition in which one TB is allocated to multiple slots configured in order to ensure reliability of channel coverage is provided. PUSCH transmission for allocating one TB to multiple slots (TB processing over multi-slot (TBoMS)) according to an embodiment of the disclosure enables flexible configuration of time domain resources, and can be used to obtain additional coding gain and improve the channel coverage through a method for determining TB for multiple slots.

According to an embodiment of the disclosure, a method for configuring repetitive transmission and a method for operating a UE to limit the maximum number of transmittable slots, when transmitting one TB to a multi-slot PUSCH based on a physical uplink shared channel (PUSCH) for transmitting one TB to multiple slots, may include: receiving, from a base station, multi-slot transmission (TBoMS) configuration information for transmission of a PUSCH configured by one TB over multi-slots; receiving, from the base station, repetitive transmission configuration information of a PUSCH configured by one TB over multi-slots and information on the maximum number of available slots; and transmitting one TB to the base station while configuring the one TB in the multi-slot PUSCH according to the configured information during one TB processing over multi-slot PUSCH transmission, based on the configured TBoMS configuration information, repetitive transmission information, and information on the maximum number of transmittable slots.

According to an embodiment of the disclosure, a method for configuring repetitive transmission and a method for operating a base station to limit the maximum number of transmittable slots, when transmitting one TB to a multi-slot PUSCH based on a physical uplink shared channel (PUSCH) for transmitting one TB to multiple slots, may include: transmitting, to a UE, multi-slot transmission (TBoMS) configuration information for transmission of a PUSCH configured by one TB over multi-slots; transmitting, to the UE, repetitive transmission configuration information of the PUSCH configured by one TB over multi-slots and information on the maximum number of available slots; receiving, from the UE, one TB processing over multi-slot PUSCH transmission and repetition according to the configured information during one TB processing over multi-slot PUSCH transmission, based on the configured TBoMS configuration information, repetitive transmission information, and information on the maximum number of transmittable slots.

According to the disclosure, a repetitive transmission method for one TB processing over multi-slot PUSCH transmission and a method for controlling the maximum number of transmittable slots will be described through embodiments.

The present embodiment provides a repetitive transmission method for one TB processing over multi-slot PUSCH transmission and a method for controlling the maximum number of transmittable slots in a 5G system. Here, the embodiment of the disclosure has been described as consecutive TBoMS PUSCH transmission for the resources capable of transmitting PUSCH based on the number of same PRBs and start symbol between TBoMS repetitions. However, this is only for illustration and does not limit the scope of the disclosure. In addition, TBoMS repetition may be configured based on the number of different PRBs, start symbols, and symbol lengths between repetitive transmissions and transmitted.

The repetitive transmission method, the method for controlling the maximum number of transmittable slots, and the method for improving the reliability of the actual PUSCH transmission of TBoMS based on a count according to the embodiment of the disclosure can improve uplink coverage through flexible time domain resource utilization and additional coding gain, and can improve the reliability of channel coverage. Hereinafter, in describing the overall embodiments of the disclosure, PUSCH transmission of TBoMS has been described as an example, but this is only for illustration and does not limit the scope of the disclosure. Further, another embodiment according to the disclosure can be applied to a case of PUSCH/PDSCH/physical sidelink shared channel (PSSCH) transmission, which is predefined/preconfigured or configured through signaling between a base station and a UE.

In addition, hereinafter, according to an embodiment of the disclosure, in a repetitive transmission method applied to multi-slot PUSCH transmission in which one TB is configured, a method for controlling the maximum number of transmittable slots, and a method for improving the reliability of a count-based TBoMS actual PUSCH transmission, a random value which is predefined/preconfigured or configured through signaling between the base station and the UE may be configured as one or a combination of symbol/slot length, continuity of PUSCH transmissions, an interval between PUSCH transmissions, the number of PUSCH transmissions, etc.

First Embodiment

The first embodiment of the disclosure may provide a TBoMS repetition method and a method for limiting the maximum number of transmittable slots when a multi-slot PUSCH transmission (TBoMS) operation is performed for one TB. In this disclosure, PUSCH is mainly described, and this method may be applied to PDSCH/PSSCH transmission.

Figure 8:
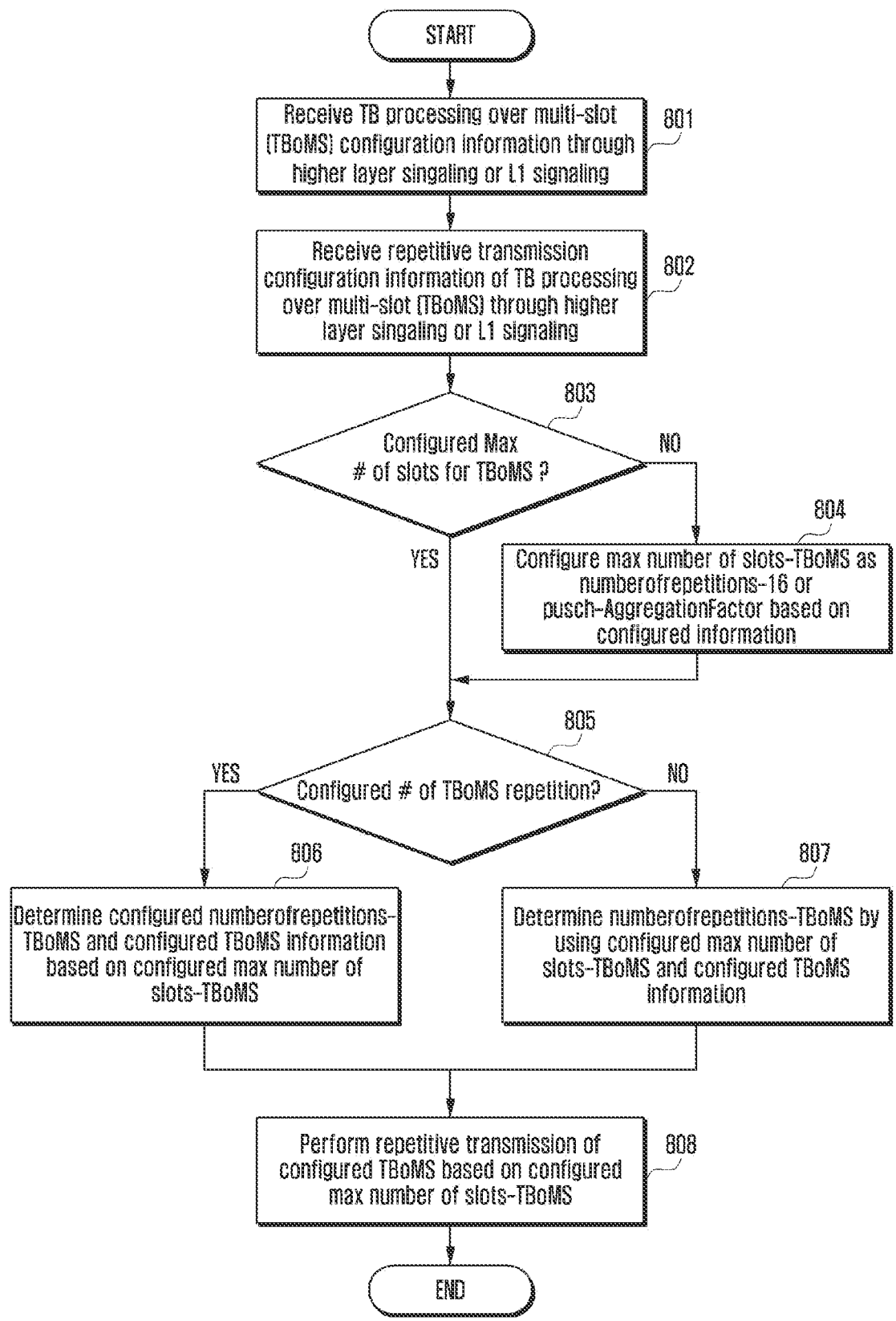
FIG. 8 is a flowchart illustrating a UE for controlling repetition of one TB processing over multi-slot PUSCH transmission (TBoMS) according to embodiments of the present disclosure.

FIG. 8 is a flowchart illustrating an operation of a UE for repeatedly transmitting TBoMS by applying the configured repetitive transmission information of TBoMS and the maximum number of slots for TBoMS in one TB processing over multi-slot PUSCH transmission in a 5G system, according to embodiments of the present disclosure.

A UE may receive, from a base station through higher layer signaling or L1 signaling, at least one of the number of slots for transmission of a one TB processing over multi-slot PUSCH (TBoMS), a start symbol, a length of a symbol, or time-domain resource allocation (TDRA) type through configuration information (indicated by reference numeral 801). In addition, the UE according to an embodiment of the disclosure may receive repetitive transmission configuration information of TBoMS from the base station based on the configured TBoMS configuration information (indicated by reference numeral 802).

The UE may determine whether there is information on the maximum number of transmittable slots configured to perform TBoMS repetition based on the configured information (indicated by reference numeral 803). For example, when "maxSlotForTBoMS-r17" is configured through higher layer signaling or L1 signaling, the configured "maxSlotForTBoMS-r17" may be applied as the maximum number of transmittable slots. On the other hand, in case that the maximum number of transmittable slots for TBoMS, configured through higher layer signaling and L1 signaling, is not configured, "numberofrepetitions-r17" or "puschAggregationFactor" may be applied to determine the maximum number of transmittable slots for TBoMS (indicated by reference numeral 804).

Thereafter, the UE may apply the number of TBoMS repetitions configured according to whether or not the configured TBoMS repetition occurs, or may apply the number of TBoMS repetitions based on the maximum number of transmittable slots (indicated by reference numeral 805). For example, when "ntumherofrepetitions-TBoMS-r17," which explicitly indicates the number of TBoMS repetitions based on the configured TBoMS transmission and TBoMS repetition configuration information, is configured from the base station, the UE may repeatedly transmit TBoMS when the total number of TBoMS resources considering the number of TBoMS repetitions and the number of TBoMS multi-slots does not exceed the configured maximum number of transmittable slots (indicated by reference numeral 806).

On the other hand, in case that TBoMS repetition is configured from the base station and there is no configuration for the number of TBoMS repetitions, the UE may determine the number of TBoMS repetitions using the configured maximum number of transmittable slots and the number of multiple slots of TBoMS (indicated by reference numeral 807). The method for obtaining the number of TBoMS repetitions using the maximum number of transmittable slots and the number of multiple slots of TBoMS may be applied according to the time domain resource configuration type of TBoMS through the following [Method 1-1] and [Method 1-2]. Thereafter, the UE may perform repetitive transmission based on the configured TBoMS (indicated by reference numeral 808).

Figure 9:
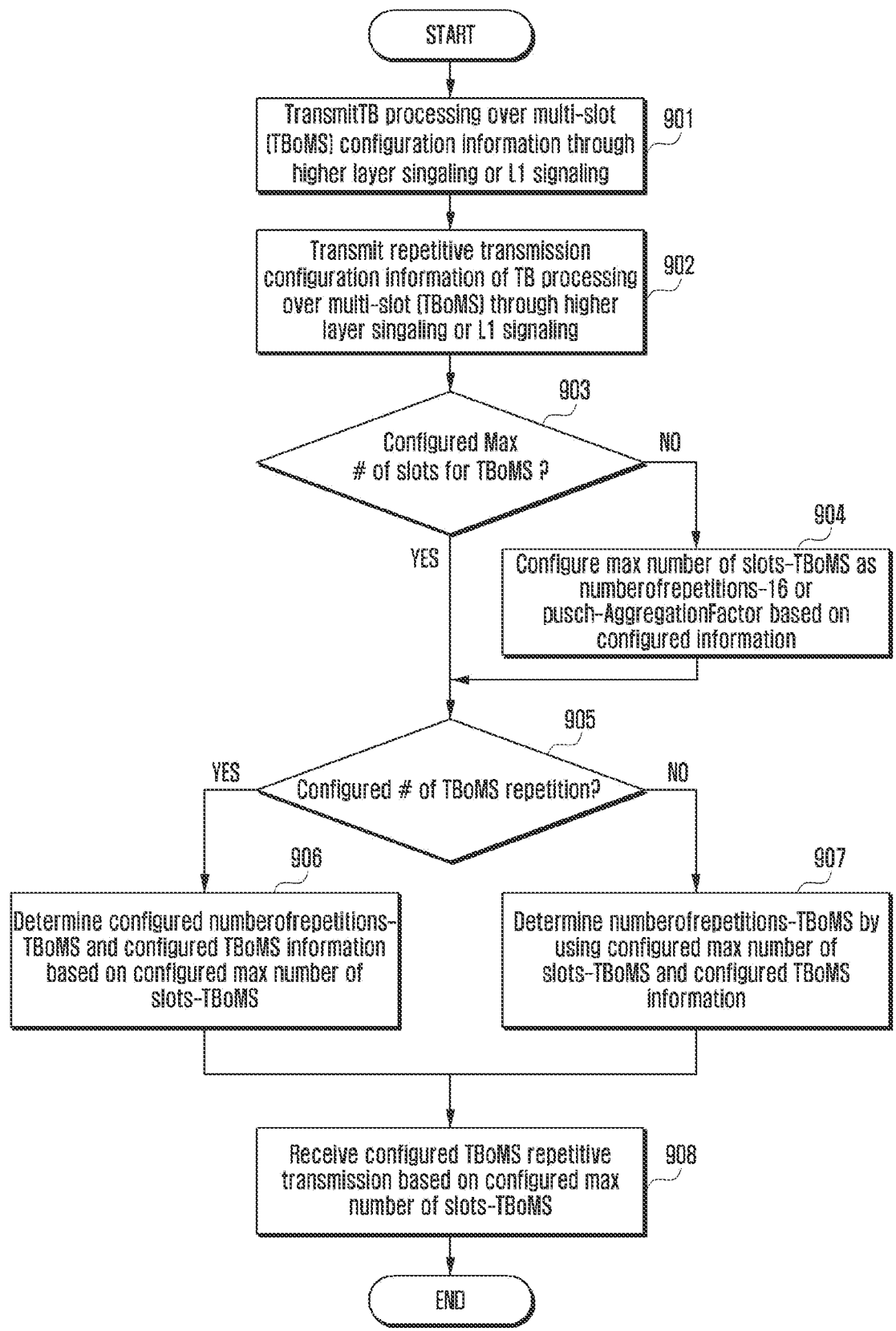
FIG. 9 is a flowchart illustrating a UE for controlling repetition of one TB processing over multi-slot PUSCH transmission (TBoMS) according to embodiments of the present disclosure.

FIG. 9 is a flowchart illustrating an operation of a base station for configuring TBoMS repetitive transmission information and the maximum number of slots for TBoMS in one TB processing over multi-slot PUSCH transmission in a 5G system, according to embodiments of the present disclosure.

A base station may transmit, to a UE through higher layer signaling or L1 signaling, at least one of the number of slots for transmission of a one TB processing over multi-slot PUSCH (TBoMS), a start symbol, a length of a symbol, or time-domain resource allocation (TDRA) type through configuration information (indicated by reference numeral 901). In addition, the base station may transmit repetitive transmission configuration information of TBoMS to the UE based on the configured TBoMS configuration information (indicated by reference numeral 902).

The base station may determine whether there is information on the maximum number of transmittable slots configured in order to determine TBoMS repetition based on the configured information (indicated by reference numeral 903). For example, when "maxSlotForTBoMS-r17" is configured through higher layer signaling or L1 signaling, the configured "maxSlotForTBoMS-r17" may be applied as the maximum number of transmittable slots. On the other hand, in case that the maximum number of transmittable slots for TBoMS, configured through higher layer signaling and L1 signaling, is not configured, "numberofrepetitions-r17" or "pusch-AggregationFactor" may be applied to determine the maximum number of transmittable slots for TBoMS (indicated by reference numeral 904).

Thereafter, the base station may apply the number of TBoMS repetitions configured according to whether or not the configured TBoMS repetition occurs, or may determine the number of TBoMS repetitions based on the maximum number of transmittable slots (indicated by reference numeral 905). For example, when the UE is configured with "rnumberofrepetitions-TBoMS-r17," which explicitly indicates the number of TBoMS repetitions based on the configured TBoMS transmission and TBoMS repetition configuration information, the base station may determine that the total number of TBoMS resources considering the number of TBoMS repetitions and the number of TBoMS multi-slots does not exceed the configured maximum number of transmittable slots (indicated by reference numeral 906).

On the other hand, in case that TBoMS repetition is configured for the UE and there is no configuration for the number of TBoMS repetitions, the base station may determine the number of TBoMS repetitions using the configured maximum number of transmittable slots and the number of multiple slots of TBoMS (indicated by reference numeral 907). The method for obtaining the number of TBoMS repetitions using the maximum number of transmittable slots and the number of multiple slots of TBoMS may be applied according to the time domain resource configuration type of TBoMS through the following [Method 1-1] and [Method 1-2]. Thereafter, the base station may receive TBoMS repetition based on the configured TBoMS (indicated by reference numeral 908).

In the above method, when the base station and the UE perform TBoMS transmission and TBoMS repetition, the UE may limit the amount of total resources for the configured TBoMS repetition not to exceed the amount of the maximum transmittable resources. In order to control the maximum transmittable resources, the UE may perform limitation according to the time domain resource configuration type of TBoMS configured through higher layer signaling and L1 signaling. When the time domain resource configuration method of TBoMS is configured like PUSCH repetitive transmission type A through higher layer signaling and L1 signaling, the maximum number of transmittable resources of TBoMS during TBoMS repetition may be limited using, as a limiting condition, $\text{Min}(N_{max,slot}^{TBoMS}, N_{multi-slot}^{TBoMS} \times N_{repetitions}^{TBoMS})$ ($N_{max,slot}^{TBoMS}$: the maximum number of slots for TBoMS, $N_{multi-slot}^{TBoMS}$ the number of multi-slots for TBoMS, $N_{repetition}^{TBoMS}$ the number of TBoMS repetitions).

In addition, when the time domain resource configuration method of TBoMS is configured like PUSCH repetition type B through higher layer signaling and L1 signaling and the symbol length "L" of TBoMS is configured for TBoMS transmission, the maximum number of transmittable resources of TBoMS during TBoMS repetition may be limited using, as a limiting condition, $\text{Min}(N_{max,slot}^{TBoMS} \times N_{symb}^{Slot}, L_{symb}^{TBoMS} \times N_{repetition}^{TBoMS})$ ($N_{max,slot}^{TBoMS}$: the maximum number of slots for TBoMS, $N_{symb}^{Slot}$: the symbol length per slot, $N_{symb}^{TBoMS}$ the symbol length of TBoMS, $N_{repetition}^{TBoMS}$: the number of TBoMS repetitions). This is for illustration only and does not limit the scope of the disclosure, and various variables such as subframe-based limitations through higher layer signaling and L1 signaling and time-based timers may be applied as a limiting condition of the maximum transmittable resource.

In the above-described method, a method for determining the number of TBoMS repetitions based on the configured maximum number of transmittable slots of the TBoMS and the number of multiple slots of the TBoMS may be determined using one of the following methods or combinations thereof.

[Method 1-1]

Method 1-1 provides a method of determining the number of TBoMS repetitions based on the maximum number of transmittable slots of TBoMS and the number of multiple slots of TBoMS described above. When PUSCH repetition type A is configured as the time domain resource configuration type of TBoMS through higher layer signaling and L1 signaling and repetitive transmission of TBoMS is configured, the number of TBoMS repetitions may be determined as $$N_{repetition}^{TBoMS} = \left\lfloor \frac{N_{max,slot}^{TBoMS}}{N_{multi-slot}^{TBoMS}} \right\rfloor$$

by using the configured maximum number of transmittable slots $N_{max,slot}^{TBoMS}$, and the number of multiple slots of $N_{multi-slot}^{TBoMS}$. Here, TBoMS repetition may occur without additional signaling for indicating the number of TBoMS repetitions.

[Method 1-2]

Method 1-2 provides a method of determining the number of TBoMS repetitions based on the maximum number of transmittable slots of TBoMS and the number of multiple slots of TBoMS described above. When PUSCH repetition type B is configured as the time domain resource configuration type of TBoMS through higher layer signaling and L1 signaling and the symbol length $L_{symb}^{TBoMS}$, of TBoMS and repetitive transmission of TBoMS are configured, the number of TBoMS repetitions may be determined as $$N_{repetition}^{TBoMS} = \left\lfloor \frac{N_{max,slot}^{TBoMS} \times N_{symb}^{Slot}}{L_{symb}^{TBoMS}} \right\rfloor$$

($N_{symb}^{slot}$: the symbol length per slot) by using the configured maximum number of transmittable slots $N_{max,slot}^{TBoMS}$, and the symbol length $L_{symb}^{TBoMS}$ of TBoMS. Here, TBoMS repetition may occur without additional signaling for indicating the number of TBoMS repetitions.

Through the above methods, repetitive transmission of TBoMS can be performed without additional signaling of TBoMS.

Through the method of the disclosure, the base station and the UE can limit the excessive time resource use for transmission of one TB. In addition, channel coverage can be improved through TBoMS repetition.

Second Embodiment

The second embodiment of the disclosure may provide a method for increasing the reliability of TBoMS transmission when performing transmission of one TB to a multi-slot PUSCH (TBoMS) and TBoMS repetition. In the disclosure, PUSCH is mainly described, and this method may also be applied to PDSCH/PSSCH transmission.

When one TB processing over multi-slot PUSCH transmission (TBoMS) and and TBoMS repetition are configured from a base station through higher layer signaling and L1 signaling, the UE may transmit a PUSCH for TBoMS with a delay, which is dropped by overlapping or a priority rule, based on a count value, in order to ensure the configured TBoMS transmission. Through the count value-based TBoMS transmission method, the reliability of the coverage of the uplink channel can be improved.

Figure 10:
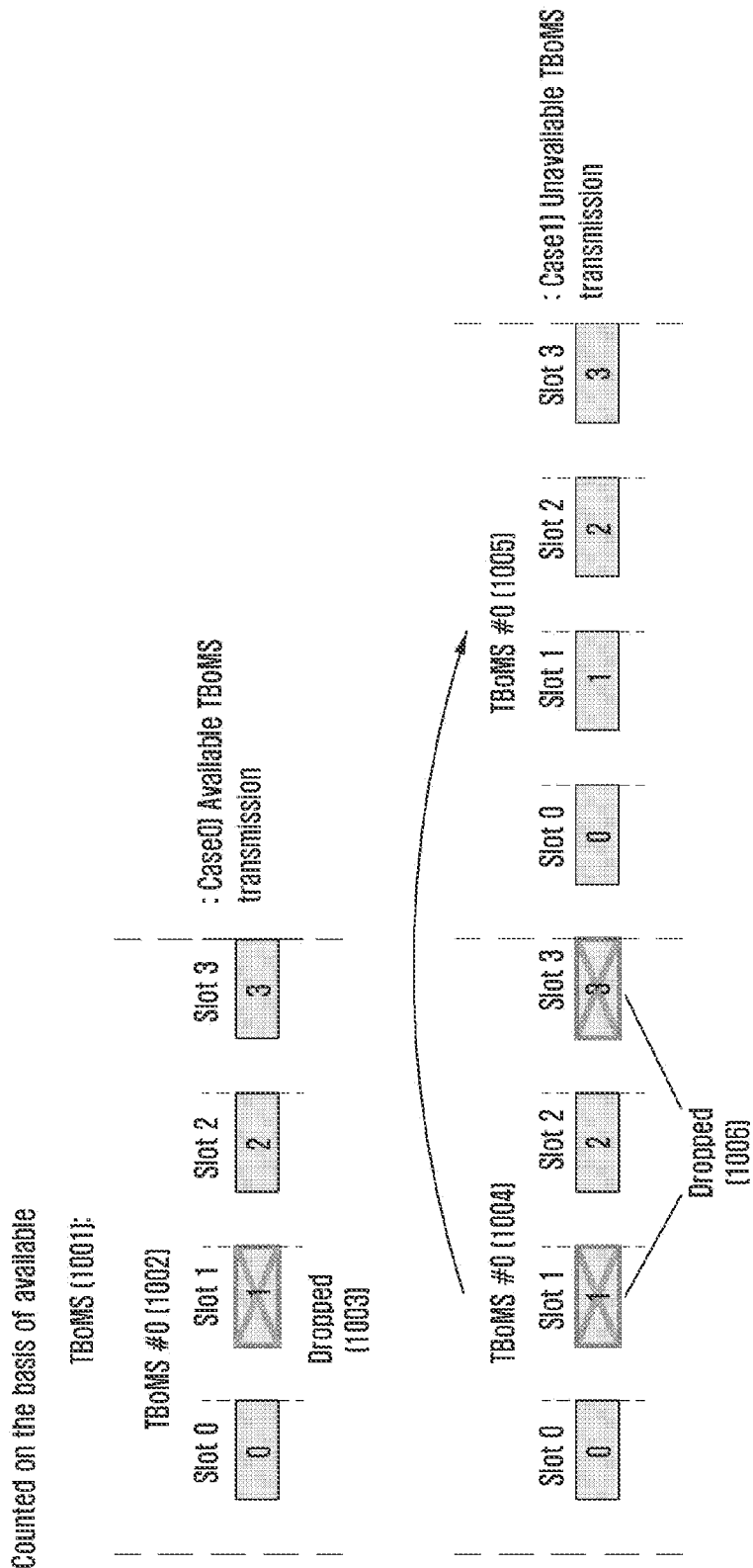
FIG. 10 illustrates an example of a count-based TBoMS transmission method of one TB processing over multi-slot PUSCH transmission (TBoMS) according to embodiments of the present disclosure.

FIG. 10 illustrates an example of a count-based TBoMS transmission method of one TB processing over multi-slot PUSCH transmission (TBoMS) according to embodiments of the present disclosure.

Referring to FIG. 10, when the number of multiple slots of TBoMS is configured to be 4 through higher layer signaling and L1 signaling, the time domain resource allocation type of TBoMS is configured like PUSCH repetition type A, and count-based TBoMS transmission 1001 in TBoMS units is configured, if slot 1 is dropped (indicated by reference numeral 1003) during transmission of TBoMS #0 1002, the UE may determine whether there is a delay by comparing the dropped resource with a threshold for determining whether TBoMS configured through higher layer signaling and L1 signaling is transmitted with a delay. Here, in a case of TBoMS #0 1002, when threshold is configured as 2 slots (Threshold=2 slots), the UE may determine that TBoMS #0 1002 has been transmitted and may not perform delayed transmission. On the other hand, in a case of TBoMS #0 1004, when slots 1 and 3 are dropped (indicated by reference numeral 1006), the number of dropped slot>=threshold, which may result in delayed transmission of TBoMS #0 1005.

Figure 11:
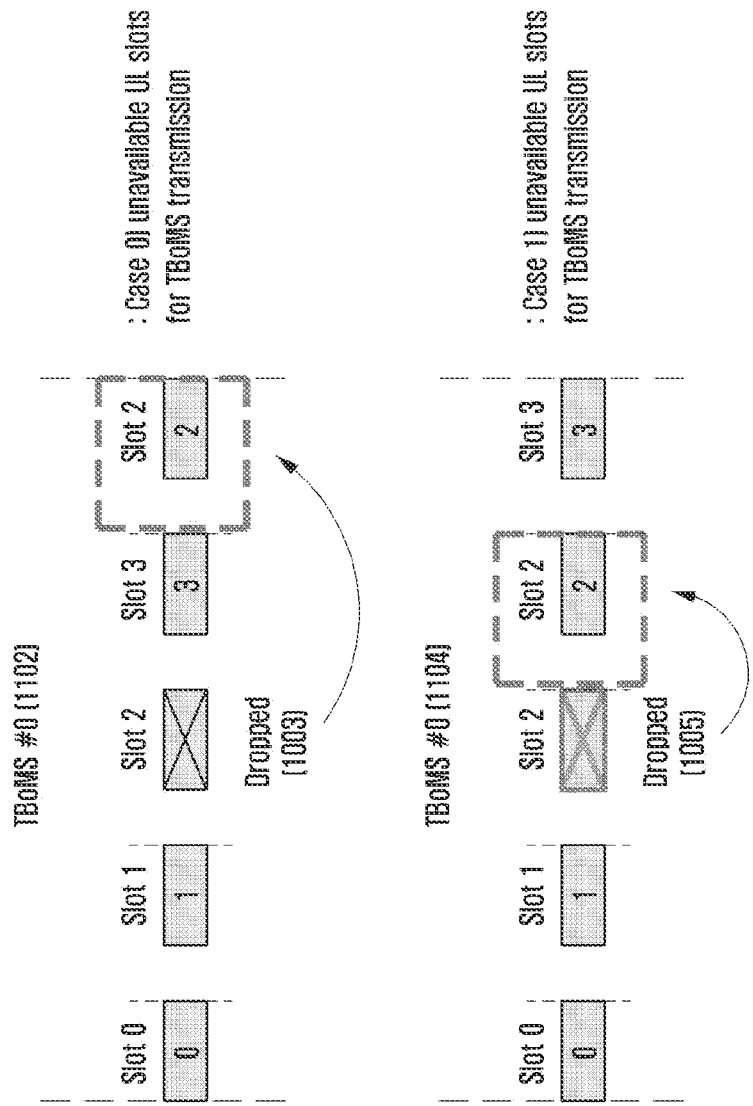
FIG. 11 illustrates an example of a count-based TBoMS transmission method of one TB processing over multi-slot PUSCH transmission (TBoMS) according to embodiments of the present disclosure.

FIG. 11 illustrates an example of a count-based TBoMS transmission method of one TB processing over multi-slot PUSCH transmission (TBoMS) according to embodiments of the present disclosure.

Referring to FIG. 11, when the number of multiple slots of TBoMS is configured to be 4 through higher layer signaling and L1 signaling, the time domain resource allocation type of TBoMS is configured like PUSCH repetition type A, and count-based TBoMS transmission 1101 with regard to TBoMS slot is configured, if slot 2 is dropped (indicated by reference numeral 1103) during transmission of TBoMS #0 1102, slot 2 may be transmitted with a delay immediately after configured slot 4. In addition, when slot 2 is dropped (indicated by reference numeral 1105) in TBoMS #0 1104, slot 2 may be transmitted to the next transmittable resource and then slot 3 may be transmitted. Through the above method, the number of TBoMS repetitions or the number of TBoMS multi-slots are counted and transmitted with a delay to increase reliability of TBoMS transmission.

FIG. 12 illustrates an example of a method for repetition and count-based TBoMS transmission of one TB processing over multi-slot PUSCH transmission (TBoMS) according to embodiments of the present disclosure.

Referring to FIG. 12, when the number of multiple slots of TBoMS is configured to be 4 through higher layer signaling and L1 signaling, the number of TBoMS repetitions is configured to be 4, and the time domain resource allocation type of TBoMS is configured like PUSCH repetition type A, TBoMS configured with four slots may be transmitted for TBoMS #0 to TBoMS #3 as many times as the configured number of repetitive transmissions. The UE may count the number of TBoMSs actually transmitted based on information on the configured TBoMS repetition, and may perform transmission as many times as the configured number of TBoMS repetitions based on the counted number of TBoMSs (indicated by reference numeral 1201). Here, the UE may receive a threshold value configured through higher layer signaling and L1 signaling in order to determine whether TBoMS transmission is successful, and may determine whether to perform TBoMS transmission based on the configured threshold and perform counting. Thereafter, the UE may perform TBoMS transmission as many times as the configured number of TBoMS repetitions based on the counted number of TBoMS.

For example, when threshold=2 slot is configured through higher layer signaling and L1 signaling and one slot 2 of TBoMS #1 1203 of the configured TBoMS repetition is dropped (indicated by reference numeral 1206), since the number of dropped slots of TBoMS #1 (indicated by reference numeral 1206) is smaller than the threshold, the UE may determine that TBoMS #1 has been transmitted and perform counting. On the other hand, in a case of transmission of TBoMS #2 1204, when two slots 0 and 2 are dropped (indicated by reference numeral 1207), since the number of dropped slots is equal to or larger than the configured threshold, TBoMS #2 1204 is not counted and transmission of TBoMS #2 1205 may occur after the end of TBoMS repetition (indicated by reference numeral 1202).

Similarly, when threshold=2 slot is configured through higher layer signaling and L1 signaling and one slot 2 of TBoMS #1 1209 of the configured TBoMS repetition is dropped (indicated by reference numeral 1212), since the number of dropped slots of TBoMS #1 (indicated by reference numeral 1212) is smaller than the threshold, the UE may determine that TBoMS #1 has been transmitted and perform counting. On the other hand, in a case of transmission of TBoMS #2 1210, when two slots 0 and 2 are dropped (indicated by reference numeral 1213), since the number of dropped slots is equal to or larger than the configured threshold, TBoMS #2 is not counted, transmission of TBoMS #2 1211 may occur using the immediate next transmittable resource (indicated by reference numeral 1208).

Figure 13:
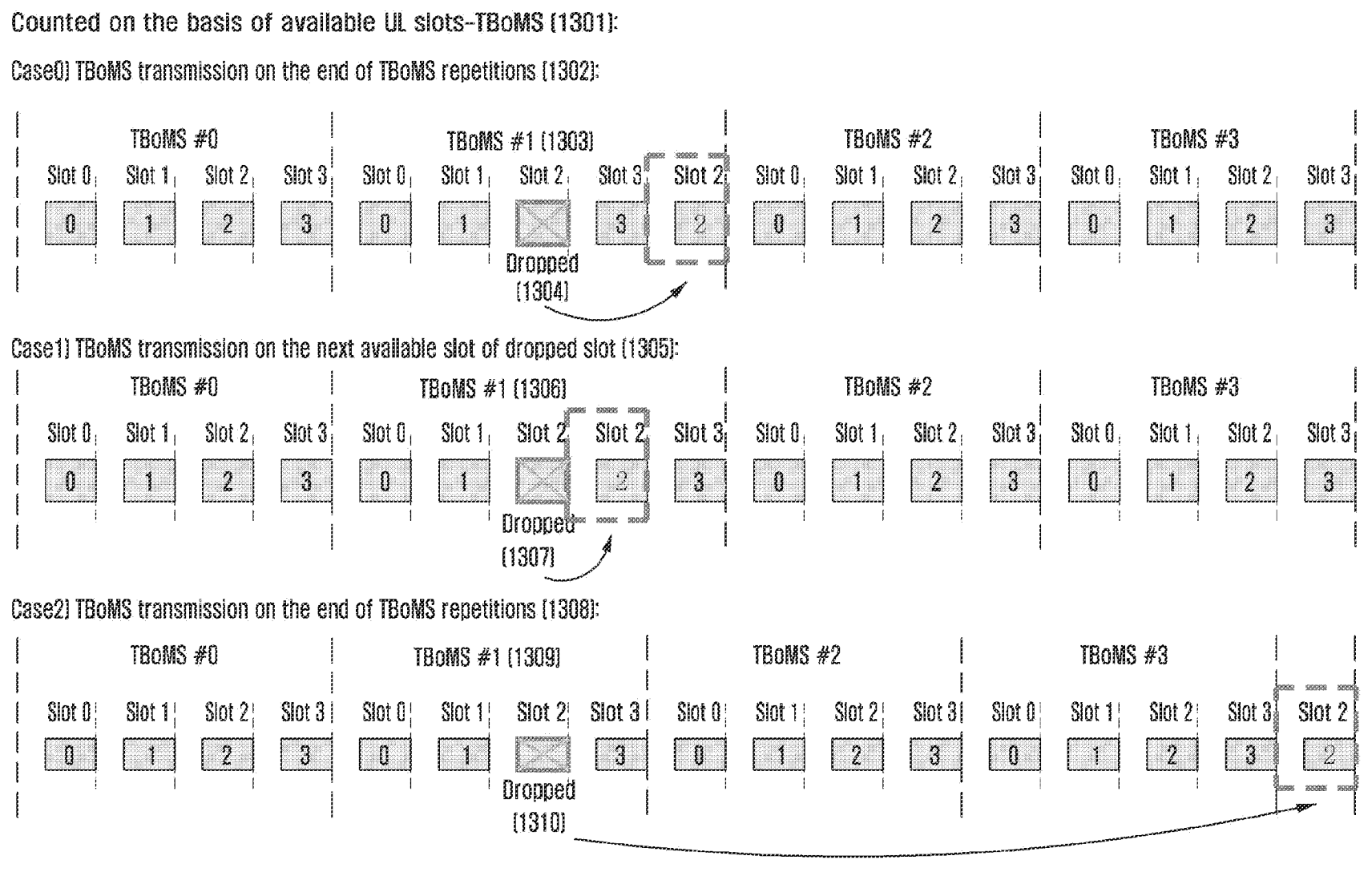

FIG. 13 illustrates an example of a method for repetition and count-based TBoMS transmission of one TB processing over multi-slot PUSCH transmission (TBoMS) according to embodiments of the present disclosure.

Referring to FIG. 13, when the number of multiple slots of TBoMS is configured to be 4 through higher layer signaling and L1 signaling, the number of TBoMS repetitions is configured to be 4, and the time domain resource allocation type of TBoMS is configured like PUSCH repetition type A, TBoMS configured with four slots may be transmitted for TBoMS #0 to TBoMS #3 as many times as the configured number of repetitive transmissions. The UE may count the number of slots of TBoMS actually transmitted based on information on the configured TBoMS repetition, and may perform transmission as many times as the configured number of slots of TBoMS repetitions based on the counted number of slots of TBoMSs (indicated by reference numeral 1301).

For example, when slot 2 is dropped (indicated by reference numerals 1304, 1307, and 1310) in TBoMS #1 1303, 1306, and 1309, with regard to the configured TBoMS repetition, delayed transmission may occur based on one or a combination of a method of performing delayed transmission for the dropped slots 1304, 1307, and 1310 immediately after completing transmission of TBoMS #1 (indicated by reference numeral 1302), a method of performing delayed transmission immediately after slot 2 of TBoMS #1 (indicated by reference numeral 1305), or a method of performing delayed transmission after completing TBoMS repetition (indicated by reference numeral 1308).

Hereinafter, in describing the overall embodiment of the disclosure, TBoMS to which time domain resources are allocated like PUSCH repetition type A has been described as an example, but this is only for illustration and does not limit the scope of the disclosure, and the embodiment according to the disclosure may be applied even to a case of TBoMS to which time domain resources are allocated like PUSCH repeated transmission type B. When TBoMS repetition in which time domain resource allocation is performed like PUSCH repetition type B through higher layer signaling and L1 signaling is configured, the count-based method may be applied to ensure the reliability of TBoMS transmission. Here, the threshold for determining whether TBoMS transmission occurs may be determined by the number of nominal repetitions, the number of actual repetitions, the length of the PUSCH symbol, and the like. In addition, the dropped TBoMS and PUSCH resources of the TBoMS may be transmitted with a delay, and the delayed transmission may occur in resources having the same size or may be rate-matched for resources having different sizes and transmitted. By using the second embodiment of the disclosure, it is possible to improve the reliability of the TBoMS repetition, thereby improving the coverage reliability of the channel.

Third Embodiment

The third embodiment of the disclosure may provide a repetitive transmission method of one TB processing over multi-slot PUSCH transmission (TBoMS).

Figure 14:
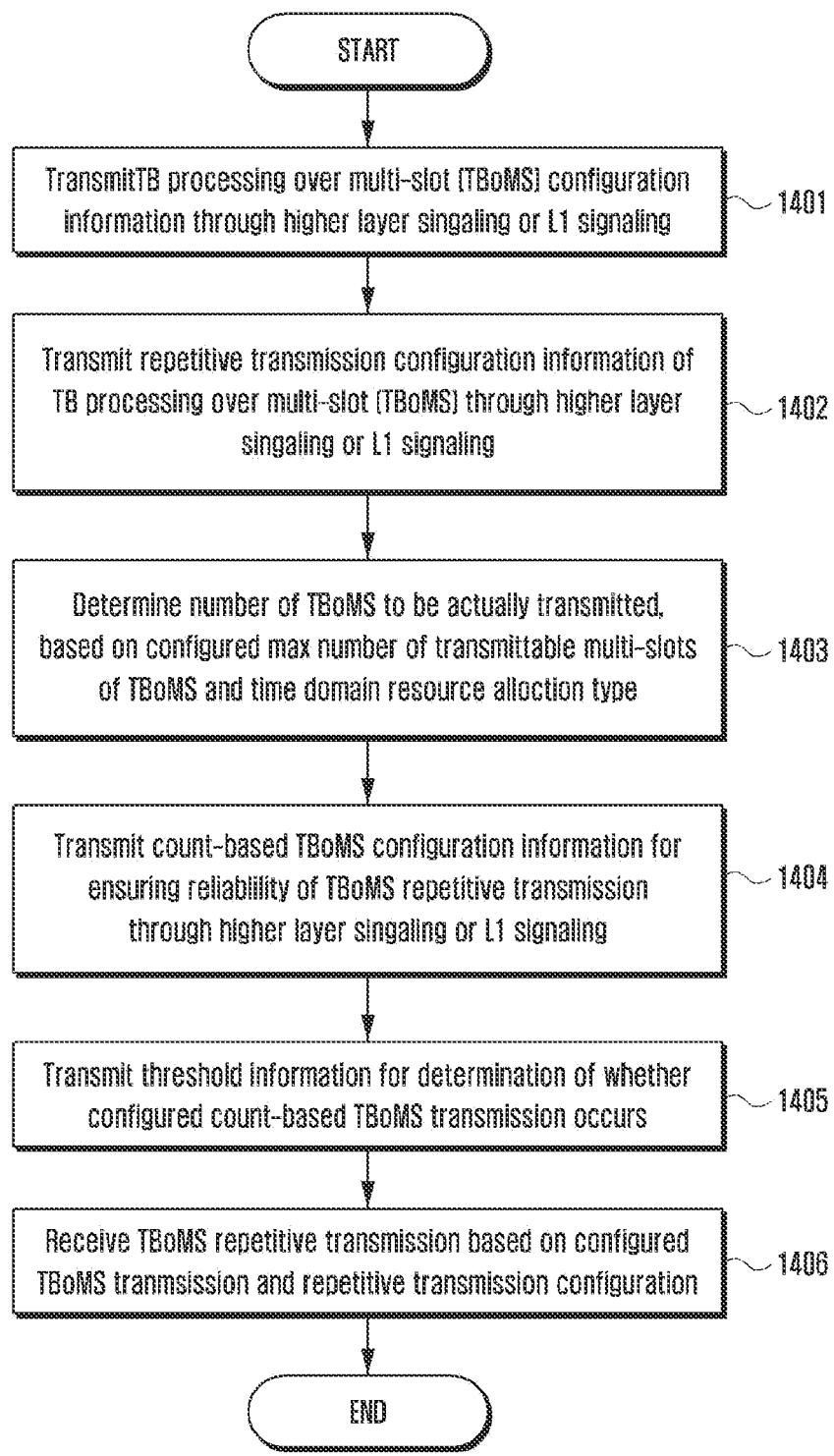
FIG. 14 is a flowchart illustrating an operation of a base station for controlling repetition and count-based TBoMS transmission for one TB processing over multi-slot PUSCH transmission according to embodiments of the present disclosure.

FIG. 14 is a flowchart illustrating an operation of a base station for controlling repetition for one TB processing over multi-slot PUSCH transmission and count-based TBoMS transmission according to embodiments of the present disclosure.

The base station may transmit TB processing over multi-slot (TBoMS) configuration information including information on the position of a start symbol, the length of a symbol, the number of multiple slots, and the type of time domain resource allocation through higher layer signaling or L1 signaling (indicated by reference numeral 1401). Thereafter, the base station may transmit repetitive transmission configuration information of TB processing over multi-slot (TBoMS) through higher layer signaling or L1 signaling (indicated by reference numeral 1402).

In addition, the base station may determine the number of TBoMSs to be actually transmitted based on the configured maximum number of transmittable multi-slots and the time domain resource allocation type of TBoMS (indicated by reference numeral 1403). Thereafter, the base station may transmit count-based TBoMS configuration information for ensuring the reliability of TBoMS repetition through higher layer signaling or L1 signaling (indicated by reference numeral 1404). Thereafter, the base station may transmit threshold information for determination of whether the configured count-based TBoMS transmission occurs (indicated by reference numeral 1405). The base station may receive TBoMS repetition based on the configured TBoMS transmission and repetitive transmission configuration (indicated by reference numeral 1406).

Figure 15:
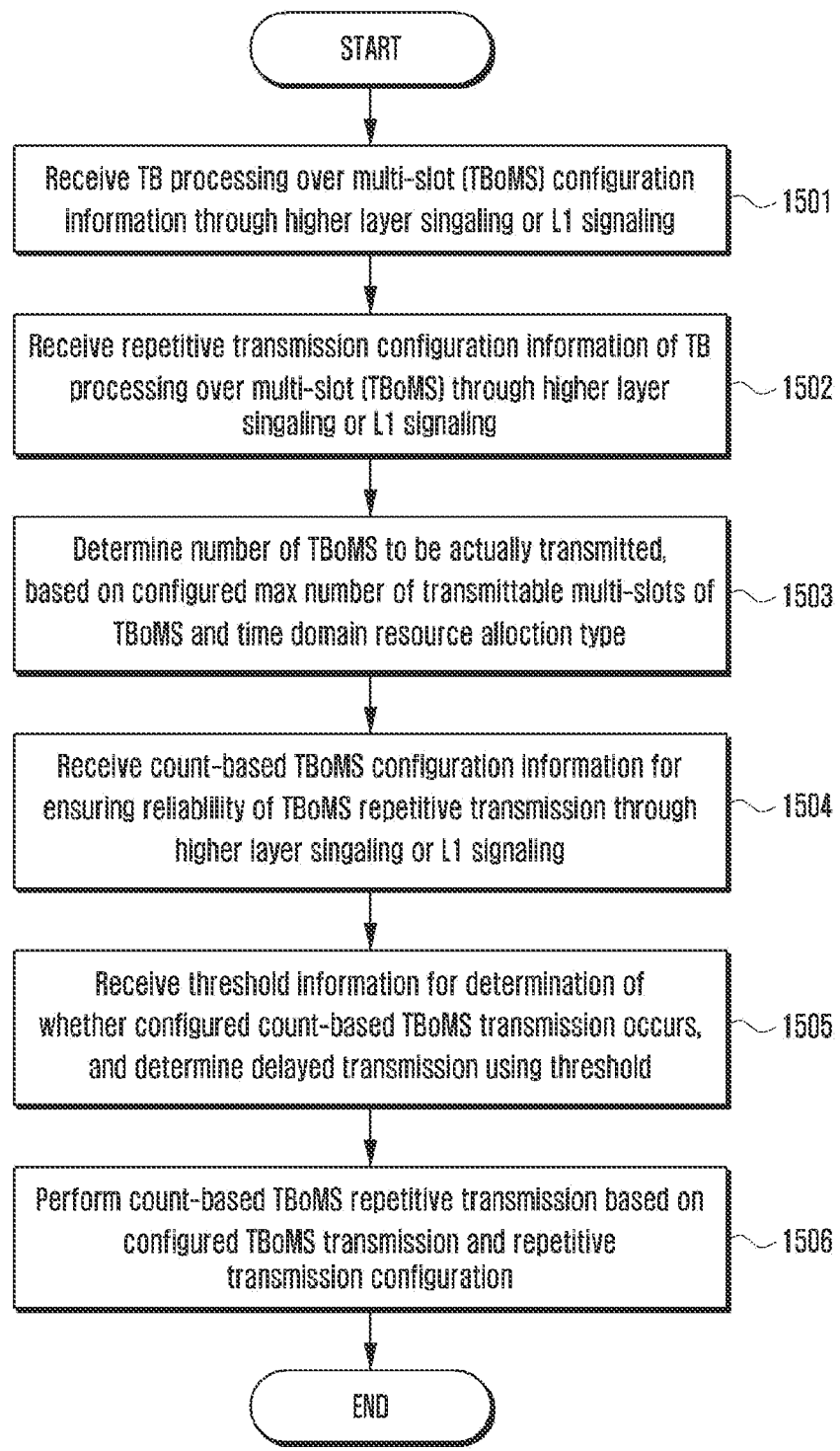
FIG. 15 is a flowchart illustrating an operation of a UE for controlling repetition and count-based TBoMS transmission for one TB processing over multi-slot PUSCH transmission according to embodiments of the present disclosure.

FIG. 15 is a flowchart illustrating an operation of a UE for controlling repetition and count-based TBoMS transmission for one TB processing over multi-slot PUSCH transmission according to embodiments of the present disclosure.

The UE may receive, from a base station, TB processing over multi-slot (TBoMS) configuration information including information on the position of a start symbol, the length of a symbol, the number of multiple slots, and the type of time domain resource allocation through higher layer signaling or L1 signaling (indicated by reference numeral 1501). Thereafter, the UE may receive repetitive transmission configuration information of TB processing over multi-slot (TBoMS) through higher layer signaling or L1 signaling (indicated by reference numeral 1502).

In addition, the UE may determine the number of TBoMSs to be actually transmitted based on the configured maximum number of transmittable multi-slots and the time domain resource allocation type of TBoMS (indicated by reference numeral 1503). Thereafter, the UE may receive count-based TBoMS configuration information for ensuring the reliability of TBoMS repetition through higher layer signaling or L1 signaling (indicated by reference numeral 1504). Thereafter, the UE may receive threshold information for determination of whether the configured count-based TBoMS transmission occurs and determine whether to perform delayed transmission by using a threshold (indicated by reference numeral 1505). Thereafter, the UE may perform the count-based TBoMS repetition based on the configured TBoMS transmission and repetitive transmission configuration (indicated by reference numeral 1506).

Figure 16:
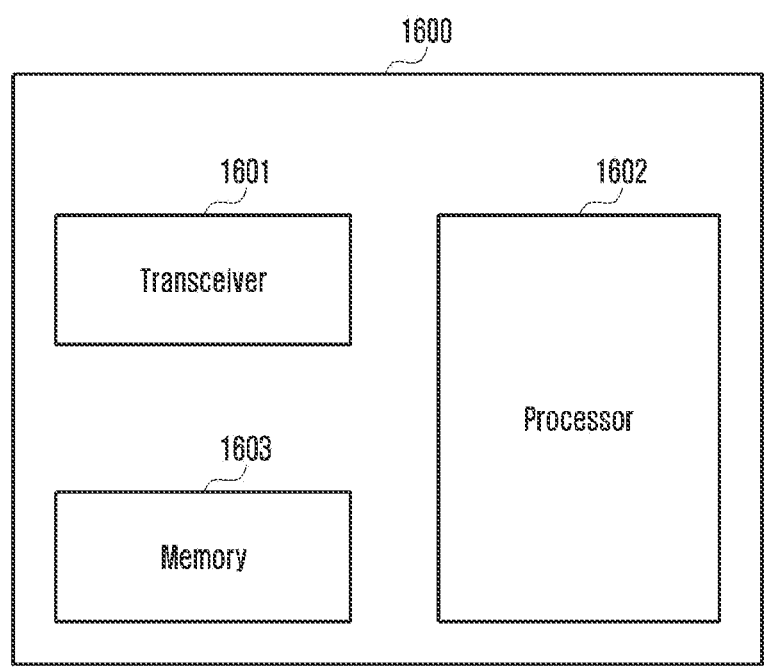
FIG. 16 is a block diagram of a UE according to embodiments of the present disclosure.

FIG. 16 is a block diagram of a UE according to embodiments of the present disclosure.

Referring to FIG. 16, a UE 1600 may include a transceiver 1601, a controller (processor) 1602, and a storage (memory) 1603. According to the efficient channel and signal transmission and reception method in a 5G communication system corresponding to the above-described embodiment, the transceiver 1601, the controller 1602, and the storage 1603 of the UE 1600 may operate. However, the elements of the UE 1600 are not limited to the above-described example. According to another embodiment, the UE 1600 may include more or fewer elements than the described elements. In addition, in a specific case, the transceiver 1601, the controller 1602, and the storage 1603 may be implemented in the form of one chip.

According to another embodiment, the transceiver 1601 may include a transmitter and a receiver. The transceiver 1601 may transmit/receive a signal to/from the base station. The signal may include control information and data. To this end, the transceiver 1601 may include an RF transmitter for up-converting and amplifying a frequency of a transmitted signal, an RF receiver for low-noise amplifying and down-converting a received signal, and the like. In addition, the transceiver 1601 may receive a signal through a wireless channel and output the signal to the controller 1602, and may transmit the signal, which is output from the controller 1602, through the wireless channel.

The controller 1602 may control a series of processes to enable the UE 1600 to be operated according to the above-described embodiment. For example, the controller 1602 may perform a method of changing an OFDM symbol position of a DMRS by considering a method of estimating a channel by simultaneously using DMRSs transmitted through a plurality of PUSCHs according to an embodiment of the disclosure. To this end, the controller 1602 may include at least one processor. For example, the controller 1602 may include a communication processor (CP) for performing control for communication and an application processor (AP) for controlling a higher layer such as an application program.

The storage 1603 may store data or control information, such as information related to channel estimation using DMRSs transmitted through a PUSCH, included in a signal acquired from the UE 1600, or may include an area for storing data required for control of the controller 1602 and data generated during control of the controller 1602.

Figure 17:
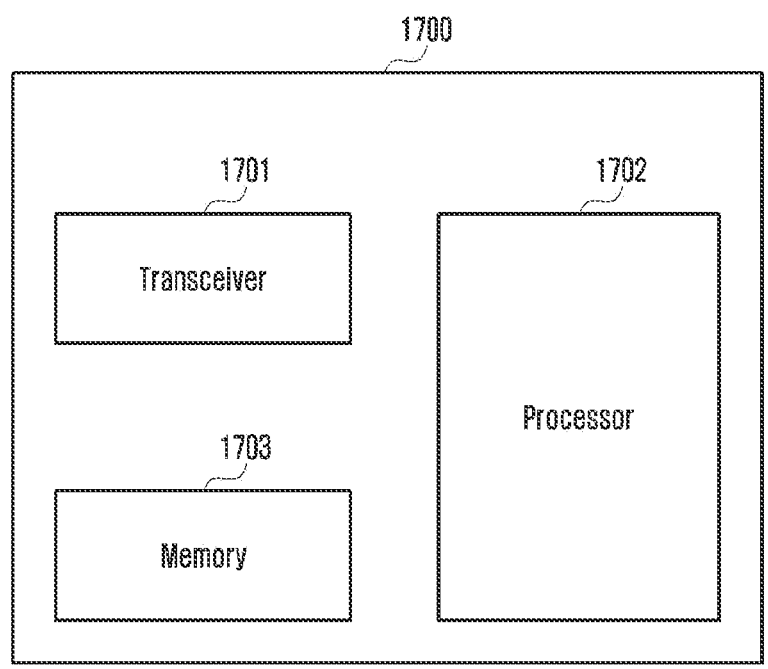
FIG. 17 is a block diagram of a base station according to embodiments of the present disclosure.

FIG. 17 is a block diagram of a base station according to embodiments of the present disclosure.

Referring to FIG. 17, a base station 1700 may include a transceiver 1701, a controller (processor) 1702, and a storage (memory) 1703. According to the efficient channel and signal transmission and reception method in a 5G communication system corresponding to the above-described embodiment, the transceiver 1701, the controller 1702, and the storage 1703 of the base station 1700 may operate. However, the elements of the base station 1700 are not limited to the above-described example. According to another embodiment, the base station 1700 may include more or fewer elements than the described elements. In addition, in a specific case, the transceiver 1701, the controller 1702, and the storage 1703 may be implemented in the form of one chip.

According to another embodiment, the transceiver 1701 may include a transmitter and a receiver. The transceiver 1701 may transmit/receive a signal to/from a UE. The signal may include control information and data. To this end, the transceiver 1701 may include an RF transmitter for up-converting and amplifying a frequency of a transmitted signal, an RF receiver for low-noise amplifying and down-converting a received signal, and the like. In addition, the transceiver 1701 may receive a signal through a wireless channel and output the signal to the controller 1702, and may transmit the signal, which is output from the controller 1702, through the wireless channel.

The controller 1702 may control a series of processes to enable the base station 1700 to be operated according to the above-described embodiment. For example, the controller 1702 may perform a method of changing an OFDM symbol position of a DMRS by considering a method of estimating a channel by using DMRSs transmitted through a PUSCH according to an embodiment of the disclosure. To this end, the controller 1702 may include at least one processor. For example, the controller 1702 may include a communication processor (CP) for performing control for communication and an application processor (AP) for controlling a higher layer such as an application program.

The storage 1703 may store data or control information, such as information related to channel estimation using DMRSs transmitted through a PUSCH determined by the base station 1700, or control information or data received from the UE, and may include an area for storing data required for control of the controller 1702 and data generated during control of the controller 1702.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, configuration information for a physical uplink shared channel (PUSCH) transmission including;
   first information on a number of slots for transport block processing over multi-slots (TBoMS) and second information on a repetition number of the TBoMS; and
   identifying a total number of slots for repetition of TBoMS transmission based on the first information and the second information,
   wherein the total number of slots is no larger than a preconfigured number of slots.

2. The method of claim 1,
   wherein the total number of slots is obtained by multiplying the number of slots for the TBoMS, N, with the repetition number of the TBoMS, M, and
   wherein the preconfigured number of slots is identified based on a maximum number of available slots for PUSCH repetition.

3. The method of claim 2,
   wherein a slot is not counted in a number of N×M slots of the TBoMS transmission for a PUSCH repetition type A in case that count-based PUSCH repetition is configured, and
   wherein the slot is unavailable for the TBoMS transmission.

4. The method of claim 1,
   wherein the configuration information further includes at least one of information on a start symbol and a length of a symbol, or information on a PUSCH repetition type.

5. A method performed by a base station in a wireless communication system, the method comprising:
   determining first information on a number of slots for transport block processing over multi-slots (TBoMS) and second information on a repetition number of the TBoMS; and
   transmitting, to a terminal, configuration information for a physical uplink shared channel (PUSCH) transmission, the configuration information including the first information and the second information,
   wherein the first information and the second information are associated with a total number of slots for repetition of TBoMS transmission, and
   wherein the total number of slots is no larger than a preconfigured number of slots.

6. The method of claim 5,
   wherein the total number of slots for repetition of the TBoMS transmission is obtained by multiplying the number of slots for the TBoMS, N, with the repetition number of the TBoMS, M, and
   wherein the preconfigured number of slots is identified based on a maximum number of available slots for PUSCH repetition.

7. The method of claim 6,
   wherein a slot is not counted in a number of N×M slots of the TBoMS transmission for a PUSCH repetition type A in case that count-based PUSCH repetition is configured, and
   wherein the slot is unavailable for the TBoMS transmission.

8. The method of claim 5,
   wherein the configuration information further includes at least one of information on a start symbol and a length of a symbol, or information on a PUSCH repetition type.

9. A terminal in a wireless communication system, the terminal comprising:
   a transceiver; and
   a controller configured to:
   control the transceiver to receive, from a base station, configuration information for a physical uplink shared channel (PUSCH) transmission including,
   first information on a number of slots for transport block processing over multi-slots (TBoMS) and second information on a repetition number of the TBoMS, and identify a total number of slots for repetition of TBoMS transmission based on the first information and the second information, wherein the total number of slots is no larger than a preconfigured number of slots.

10. The terminal of claim 9, wherein the total number of slots is obtained by multiplying the number of slots for the TBoMS, N, with the repetition number of the TBoMS, M, and wherein the preconfigured number of slots is identified based on a maximum number of available slots for PUSCH repetition.

11. The terminal of claim 10, wherein a slot is not counted in a number of N×M slots of the TBoMS transmission for a PUSCH repetition type A in case that count-based PUSCH repetition is configured, and wherein the slot is unavailable for the TBoMS transmission.

12. The terminal of claim 9, wherein the configuration information further includes at least one of information on a start symbol and a length of a symbol, or information on a PUSCH repetition type.

13. A base station in a wireless communication system, the base station comprising:

a transceiver; and a controller configured to:

determine first information on a number of slots for transport block processing over multi-slots (TBoMS) and second information on a repetition number of the TBoMS, and control the transceiver to transmit, to a terminal, configuration information for a physical uplink shared channel (PUSCH) transmission, the configuration information including the first information and the second information, wherein the first information and the second information are associated with a total number of slots for repetition of TBoMS transmission, and wherein the total number of slots is no larger than a preconfigured number of slots.

14. The base station of claim 13, wherein the total number of slots for repetition of the TBoMS transmission is obtained by multiplying the number of slots for the TBoMS, N, with the repetition number of the TBoMS, M, and wherein the preconfigured number of slots is identified based on a maximum number of available slots for PUSCH repetition.

15. The base station of claim 14, wherein a slot is not counted in a number of N×M slots of the TBoMS transmission for a PUSCH repetition type A in case that count-based PUSCH repetition is configured, and wherein the slot is unavailable for the TBoMS transmission.

16. The base station of claim 13, wherein the configuration information further includes at least one of information on a start symbol and a length of a symbol, or information on a PUSCH repetition type.

* * * * *